United States Patent
Arpin et al.

(10) Patent No.: US 9,847,022 B2
(45) Date of Patent: Dec. 19, 2017

(54) VEHICLE DETECTION SYSTEM AND METHOD

(71) Applicant: Ace/Avant Concrete Construction Co., Inc., Archdale, NC (US)

(72) Inventors: William G. Arpin, Archdale, NC (US); Jonathan L. Matson, Archdale, NC (US)

(73) Assignee: Ace/Avant Concrete Construction Co., Inc., Archdale, NC (US)

( * ) Notice: Subject to any disclaimer, the term of this patent is extended or adjusted under 35 U.S.C. 154(b) by 0 days.

(21) Appl. No.: 15/217,710

(22) Filed: Jul. 22, 2016

(65) Prior Publication Data

US 2017/0025003 A1    Jan. 26, 2017

Related U.S. Application Data

(60) Provisional application No. 62/195,432, filed on Jul. 22, 2015, provisional application No. 62/207,339, filed on Aug. 19, 2015.

(51) Int. Cl.

| | |
|---|---|
| *G08G 1/065* | (2006.01) |
| *G08G 1/056* | (2006.01) |
| *G05B 15/02* | (2006.01) |
| *G08G 1/04* | (2006.01) |
| *G01V 8/12* | (2006.01) |
| *G08G 1/01* | (2006.01) |
| *G08G 1/16* | (2006.01) |
| *G06K 9/00* | (2006.01) |
| *G08G 1/017* | (2006.01) |

(52) U.S. Cl.
CPC .............. *G08G 1/056* (2013.01); *G01V 8/12* (2013.01); *G05B 15/02* (2013.01); *G06K 9/00785* (2013.01); *G08G 1/0116* (2013.01); *G08G 1/04* (2013.01); *G08G 1/164* (2013.01); *G08G 1/166* (2013.01); *G08G 1/0175* (2013.01)

(58) Field of Classification Search
CPC ........ G08G 1/056; G08G 1/0116; G08G 1/04; G08G 1/164; G08G 1/166; G08G 1/0175; G01V 8/12; G05B 15/02; G06K 9/00771; G06K 2209/15
USPC ........................................................ 340/935
See application file for complete search history.

(56) References Cited

U.S. PATENT DOCUMENTS

| | | | |
|---|---|---|---|
| 3,559,756 A | 2/1971 | Torres | |
| 5,170,162 A * | 12/1992 | Fredericks | ............. G08G 1/056 340/554 |
| 5,203,422 A | 4/1993 | Estep et al. | |
| 5,529,138 A | 6/1996 | Shaw et al. | |
| 5,734,343 A | 3/1998 | Urbish et al. | |

(Continued)

*Primary Examiner* — Kerri McNally
*Assistant Examiner* — Thang Tran
(74) *Attorney, Agent, or Firm* — Dicke, Billig & Czaja, PLLC

(57) ABSTRACT

A vehicle detection system includes a sensor mounted to establish a light curtain along a portion of a roadway, and a control unit operatively coupled with the sensor to detect a vehicle on the roadway. The light curtain defines a first zone and a second zone within the first zone such that detection of the vehicle in the first zone followed by detection of the vehicle in the second zone indicates a correct direction of travel of the vehicle, and detection of the vehicle in the second zone prior to detection of the vehicle in the first zone indicates a wrong direction of travel of the vehicle.

20 Claims, 27 Drawing Sheets

(56) References Cited

U.S. PATENT DOCUMENTS

| | | | |
|---|---|---|---|
| 6,084,533 A | 7/2000 | Morgan et al. | |
| 8,125,349 B2 | 2/2012 | May | |
| 8,265,987 B2 | 9/2012 | Goto | |
| 8,428,861 B1* | 4/2013 | Williams | G08G 1/164 701/301 |
| 8,947,259 B2 | 2/2015 | Tagawa et al. | |
| 2002/0003489 A1* | 1/2002 | Samukawa | G01S 17/42 342/70 |
| 2005/0171694 A1* | 8/2005 | Schirmer | G01C 21/3626 701/411 |
| 2008/0068165 A1* | 3/2008 | DeWitt | G08G 1/075 340/572.1 |
| 2009/0231161 A1* | 9/2009 | Malarky | G07B 15/063 340/933 |
| 2010/0228482 A1* | 9/2010 | Yonak | G01S 3/8083 701/301 |
| 2010/0231720 A1* | 9/2010 | Tucker | G06K 9/00785 348/149 |
| 2012/0148092 A1* | 6/2012 | Ni | G06K 9/00785 382/103 |
| 2012/0268260 A1* | 10/2012 | Miller | B60W 50/14 340/435 |
| 2013/0147639 A1 | 6/2013 | Wietfeld et al. | |
| 2013/0151135 A1* | 6/2013 | Aubrey | G08G 1/00 701/118 |
| 2013/0162448 A1* | 6/2013 | Mochizuki | G08G 1/096775 340/905 |
| 2013/0338850 A1* | 12/2013 | Takahara | G01C 21/3697 701/1 |
| 2014/0159925 A1* | 6/2014 | Mimeault | G01S 17/58 340/935 |
| 2014/0210645 A1* | 7/2014 | Sharma | G08G 1/052 340/907 |
| 2014/0226015 A1* | 8/2014 | Takatsudo | B60R 1/00 348/148 |
| 2014/0232566 A1* | 8/2014 | Mimeault | G01S 17/023 340/935 |
| 2014/0350837 A1 | 11/2014 | Galbas et al. | |
| 2015/0077271 A1 | 3/2015 | Alshinnawi et al. | |
| 2015/0127190 A1 | 5/2015 | Fuehrer | |
| 2015/0146001 A1 | 5/2015 | White | |
| 2015/0148987 A1 | 5/2015 | Jeschke et al. | |
| 2016/0210855 A1* | 7/2016 | Jeschke | G08G 1/04 |
| 2016/0217687 A1* | 7/2016 | Rous | G08G 1/056 |

* cited by examiner

VEHICLE DETECTION SYSTEM AND METHOD

CROSS-REFERENCE TO RELATED APPLICATIONS

This application claims priority under 35 U.S.C. §119(e) to U.S. Provisional Patent Application Ser. No. 62/195,432, filed on Jul. 22, 2015, and incorporated herein by reference, and claims priority under 35 U.S.C. §119(e) to U.S. Provisional Patent Application Ser. No. 62/207,339, filed on Aug. 19, 2015, and incorporated herein by reference.

FIELD OF THE INVENTION

The present invention relates generally to a vehicle detection system and method and, more specifically, to detecting wrong-way travel of a vehicle.

BACKGROUND OF THE INVENTION

Wrong-way driving includes driving a motor vehicle against the direction of traffic. Wrong-way driving can occur on one-way or two-way roads, and may be due to driver inattention or impairment, or because of insufficient or confusing road markings or signage, or may be intentional (e.g., a driver driving the wrong way because they missed an exit, for thrill-seeking, or as a shortcut). Driving the wrong-way may result in a head-on collision, the consequences of which may be tragic and deadly.

DETAILED DESCRIPTION

Figure 1:
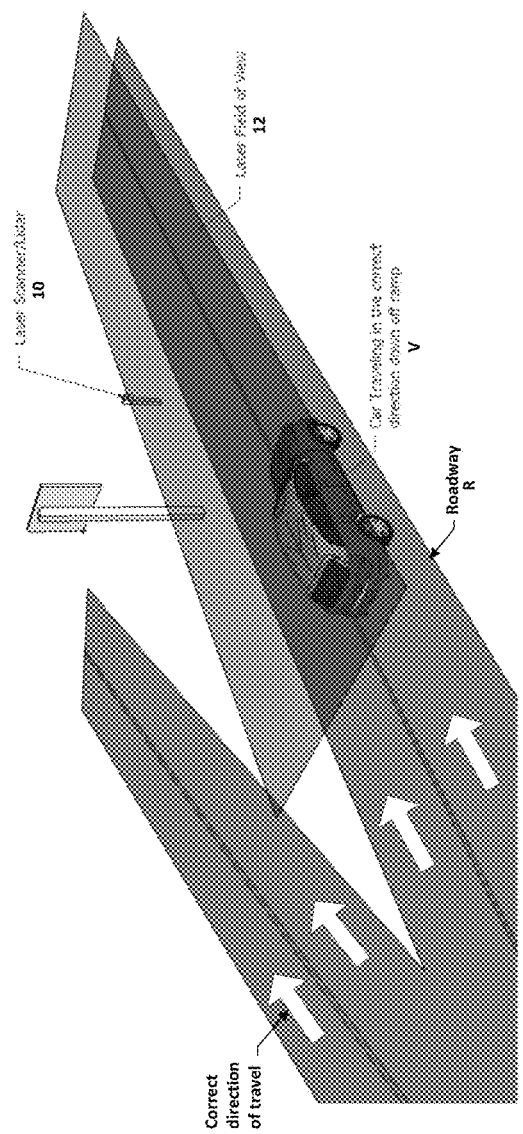
FIG. 1 illustrates an example of a vehicle detection system and method, including detection of a vehicle traveling in a correct direction.

The concept being presented is a system and method for detecting a vehicle (or vehicles). More specifically, the system and method described herein provides for detecting a vehicle (or vehicles) that is traveling in the wrong direction (i.e., opposite the correct, proper, or intended direction of travel) on a roadway (street, road, highway, freeway, expressway, turnpike, off-ramp, on-ramp, etc). The system and method described herein also may be used for detecting a vehicle (or vehicles) that is near, at, or exceeds a height limit or clearance of a roadway such as, for example, a height limit or clearance under a bridge, overpass, or other.

In one embodiment, the vehicle detection system and method incorporates one or more laser sensors/scanners, such as one or more time-of-flight (TOF) laser sensors/scanners or one or more phase shift laser sensors/scanners, and a control unit with which other components (the laser sensor(s)/scanner(s), power supply, communication devices, etc.) are operatively and/or communicatively coupled so as to operate as a vehicle detection system. The control unit may include a memory and a processor, with associated hardware and/or machine readable instructions (including firmware and/or software) embodied on a computer readable medium, for implementing and/or executing computer-readable, computer-executable instructions for data processing functions and/or functionality of the system and method. As such, and as described below, the system and method uses laser sensor(s)/scanner(s), such as time-of-flight (TOF) laser sensor(s)/scanner(s) or phase shift laser sensor(s)/scanner(s), and associated hardware and software to detect a vehicle (or vehicles), including a vehicle that is traveling in the wrong direction on a roadway and/or a vehicle that is near, at, or exceeds a height limit or clearance of a roadway.

In one embodiment, one or more laser sensors/scanners 10, such as one or more time-of-flight (TOF) laser sensors/scanners (Lidar) or one or more phase shift laser sensors/scanners, are mounted to the side of and/or above the roadway R where vehicles V will be traveling (FIGS. 1-19). In one embodiment, the laser sensor/scanner 10 has a laser field of view 12 and creates or establishes an invisible light shield or light curtain (e.g., class-1 infra-red eye safe light shield or light curtain) used to detect a vehicle V or vehicles V. In one embodiment, in detecting a vehicle V or vehicles V, the laser sensor/scanner 10 functions as a measurement device. Thus, with the laser sensor/scanner 10, a direction of travel, count, size, speed, and/or location (e.g., within a lane) of a vehicle V or vehicles V can be determined within the laser field of view 12. Exemplary time-of-flight (TOF) laser sensors/scanners useable within the system and method described herein include LMS and TiM laser scanners by Sick AG. Exemplary phase shift laser sensors/scanners useable within the system and method described herein include LMS 400 laser scanners by Sick AG.

As illustrated in the examples of FIGS. 1, 2a, 2b, 3, 4a, 4b, 5, and 6, the laser sensor/scanner 10 is mounted to the side of the roadway R such that the laser field of view 12 creates or establishes an invisible light shield or light curtain generally parallel with the roadway R in an area or areas where a vehicle V or vehicles V will be traveling. Although illustrated with two-lane roadways, it is understood that any number of lanes (one or more than one) may be monitored.

Figure 2A:
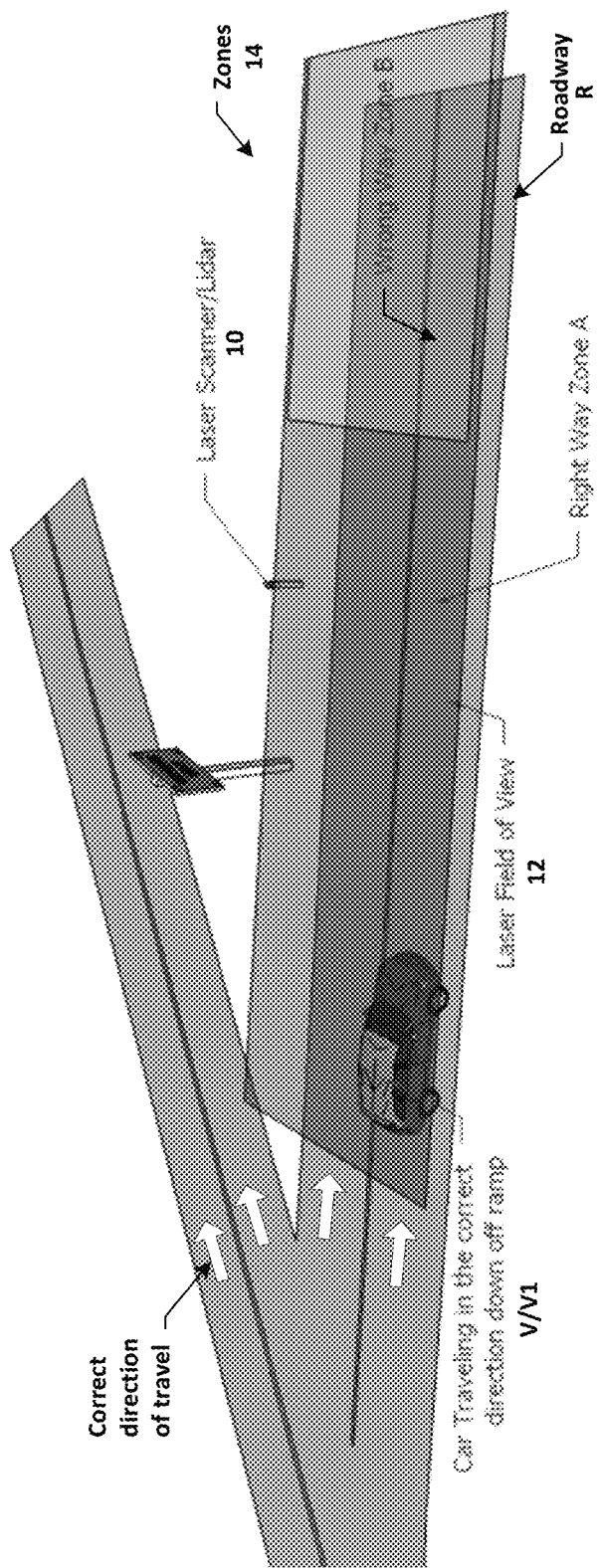
FIGS. 2a and 2b illustrate an example of a vehicle detection system and method, including detection of a vehicle traveling in a correct direction.
Figure 2B:
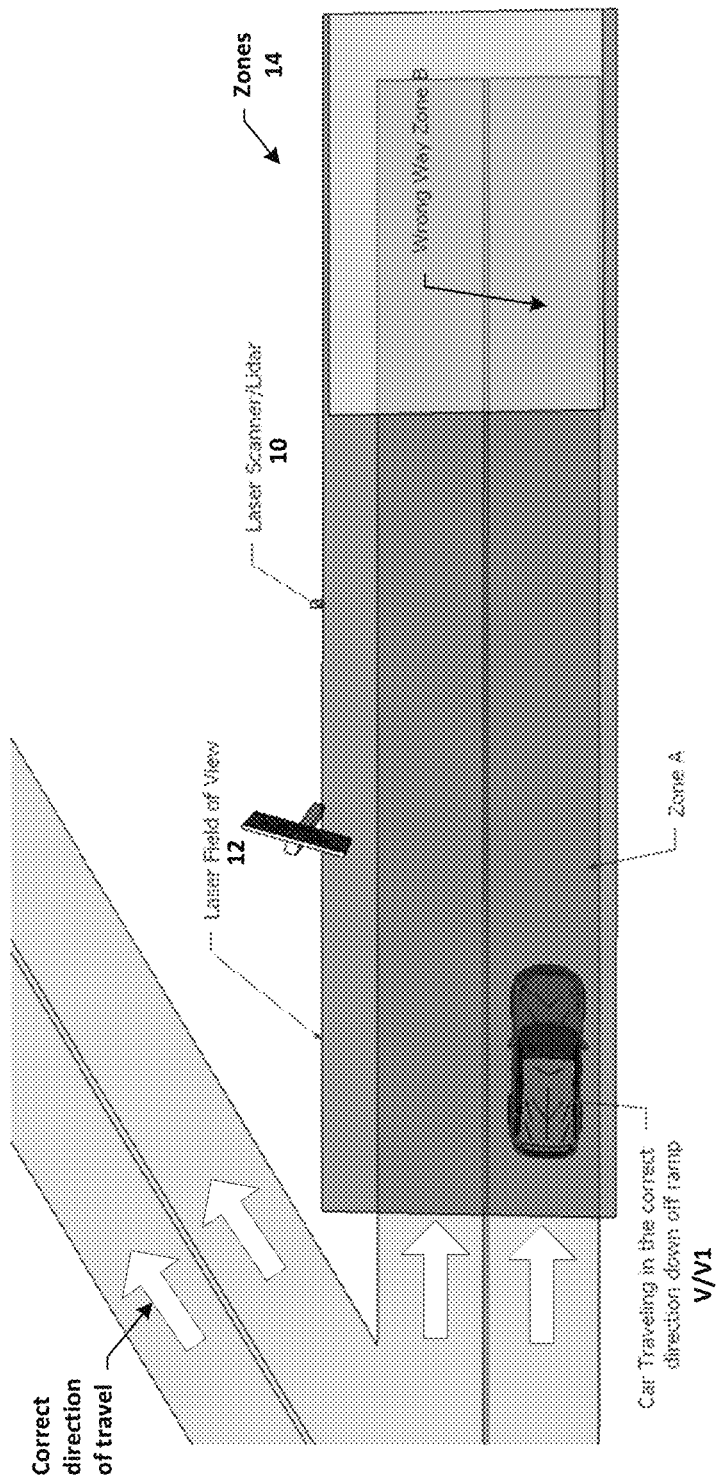
Figure 3:
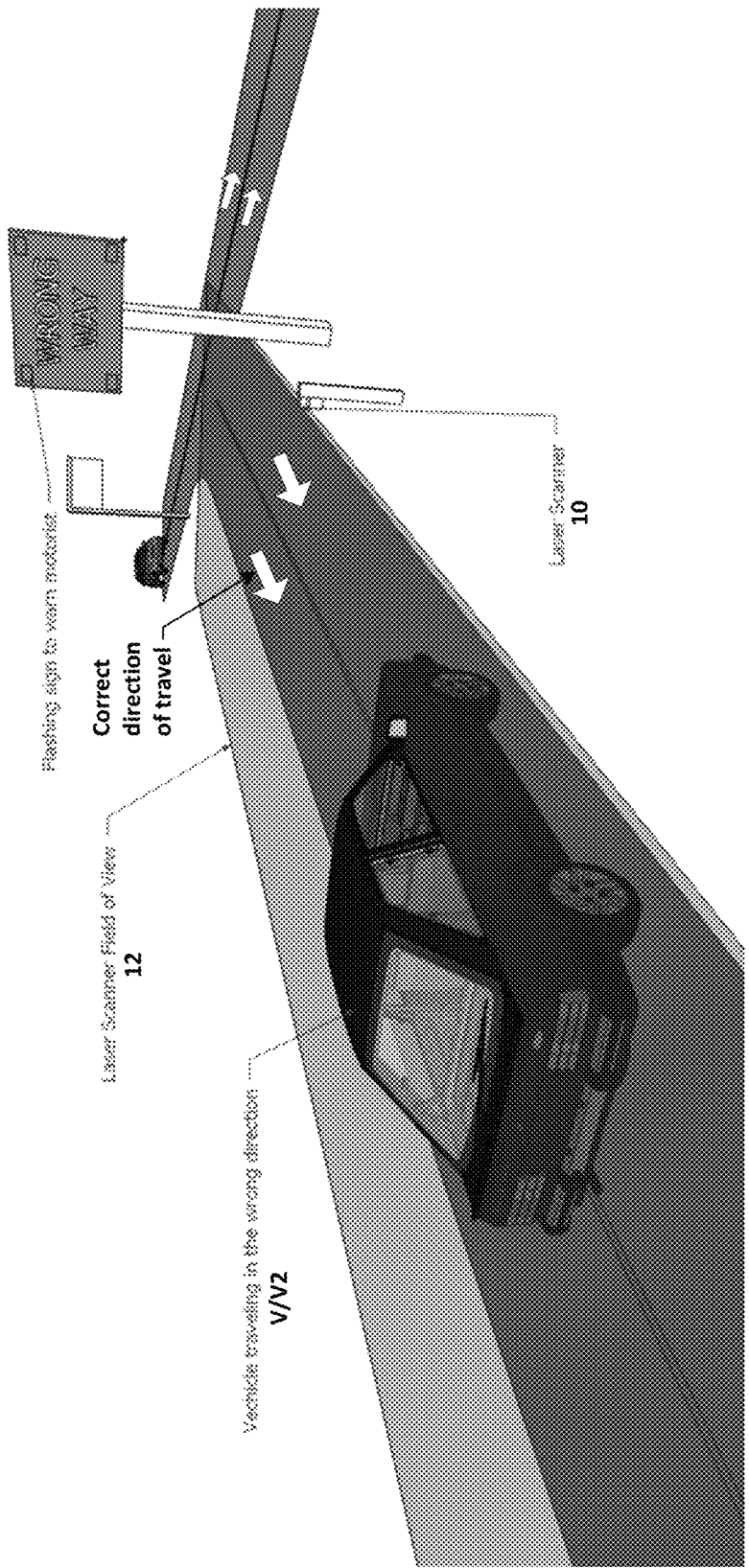
FIG. 3 illustrates an example of a vehicle detection system and method, including detection of a vehicle traveling in a wrong direction.

In the examples of FIGS. 1, 2a, and 2b, the vehicle V1 is traveling in the correct or proper direction (e.g., the correct direction on a freeway off-ramp). As the vehicle V1 enters (and travels through) the laser field of view 12, the laser sensor/scanner 10 detects the vehicle V1 and the system determines that the vehicle V1 is traveling in the correct or proper direction.

In one embodiment, as illustrated in the examples of FIGS. 2a and 2b, the light shield or light curtain of the laser field of view 12 includes multiple zones 14. In one implementation, the zones 14 include a "right-way" zone, identified as Zone A, and a "wrong-way" zone, identified as Zone B, such that the zones 14 are arranged in an A-to-B configuration with the correct or proper direction of travel. In this implementation, Zone B is within and/or overlaps Zone A such that a vehicle V1 traveling in the proper direction enters Zone A and remains in Zone A even while the vehicle V1 enters and travels through Zone B. In one example, when the vehicle V1 enters Zone A (i.e., enters in the proper direction), the system temporally inactivates or disables Zone B. In this example, since the vehicle V1 has entered the laser field of view 12 in the proper direction (i.e., entered Zone A first), the system temporally inactivates or disables Zone B for the duration that the vehicle V1 is in the laser field of view 12. In one embodiment, the system generates a count of the right-way travel.

In the examples of FIGS. 3, 4a, 4b, and 5, the vehicle V2 is traveling the wrong-way (e.g., the wrong direction on a freeway off-ramp). As the vehicle V2 enters (and travels through) the laser field of view 12, the laser sensor/scanner 10 detects the vehicle V2 and the system determines that the vehicle V2 is traveling in the wrong direction.

Figure 4A:
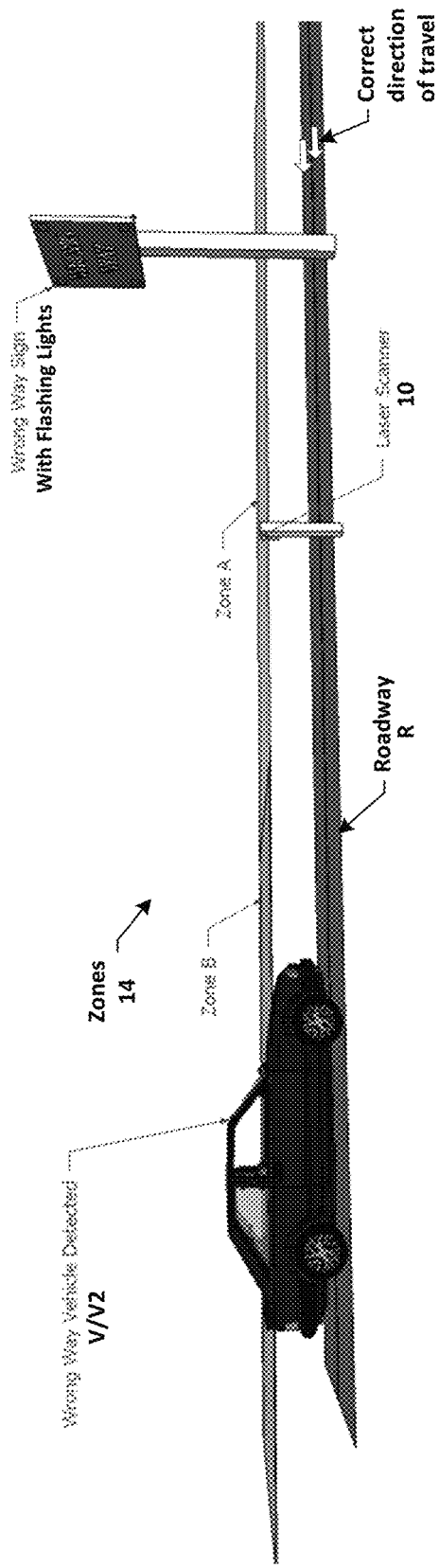
FIGS. 4a and 4b illustrate an example of a vehicle detection system and method, including detection of a vehicle traveling in a wrong direction.
Figure 4B:
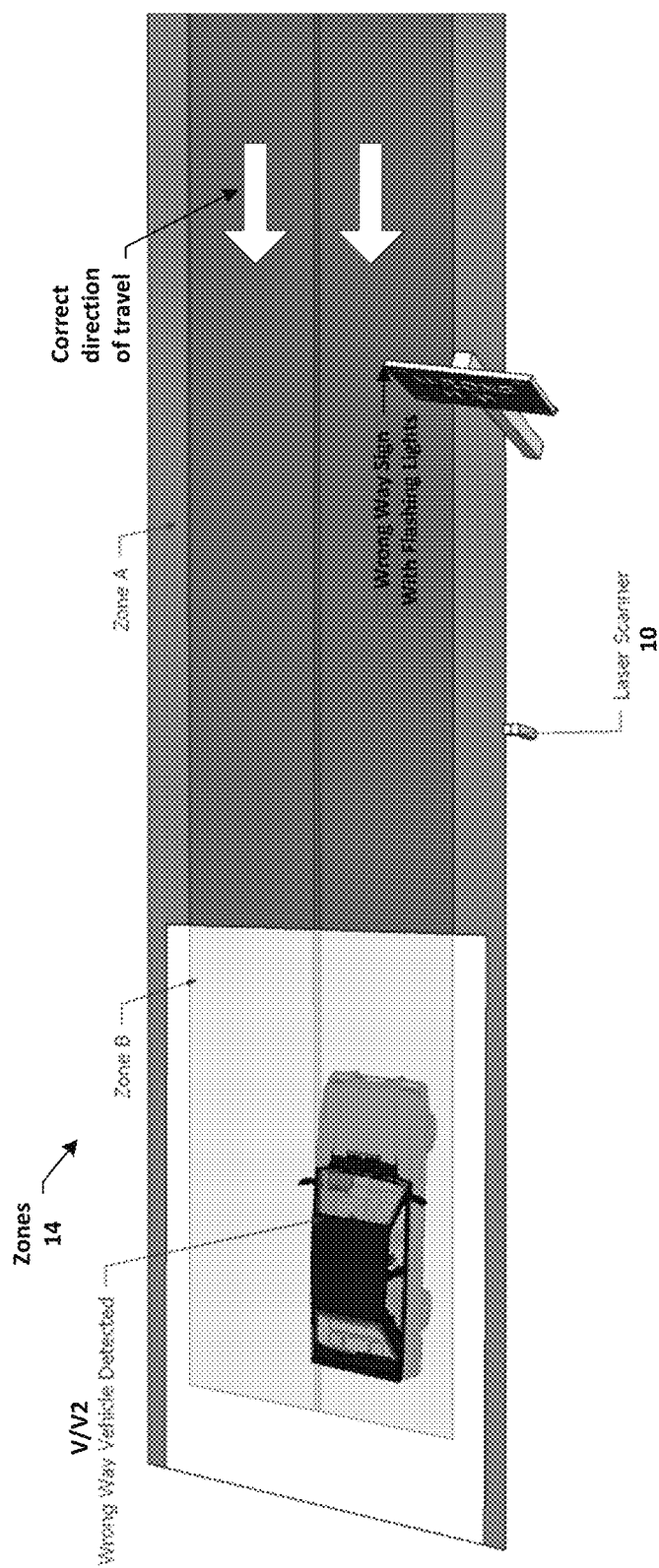
Figure 5:
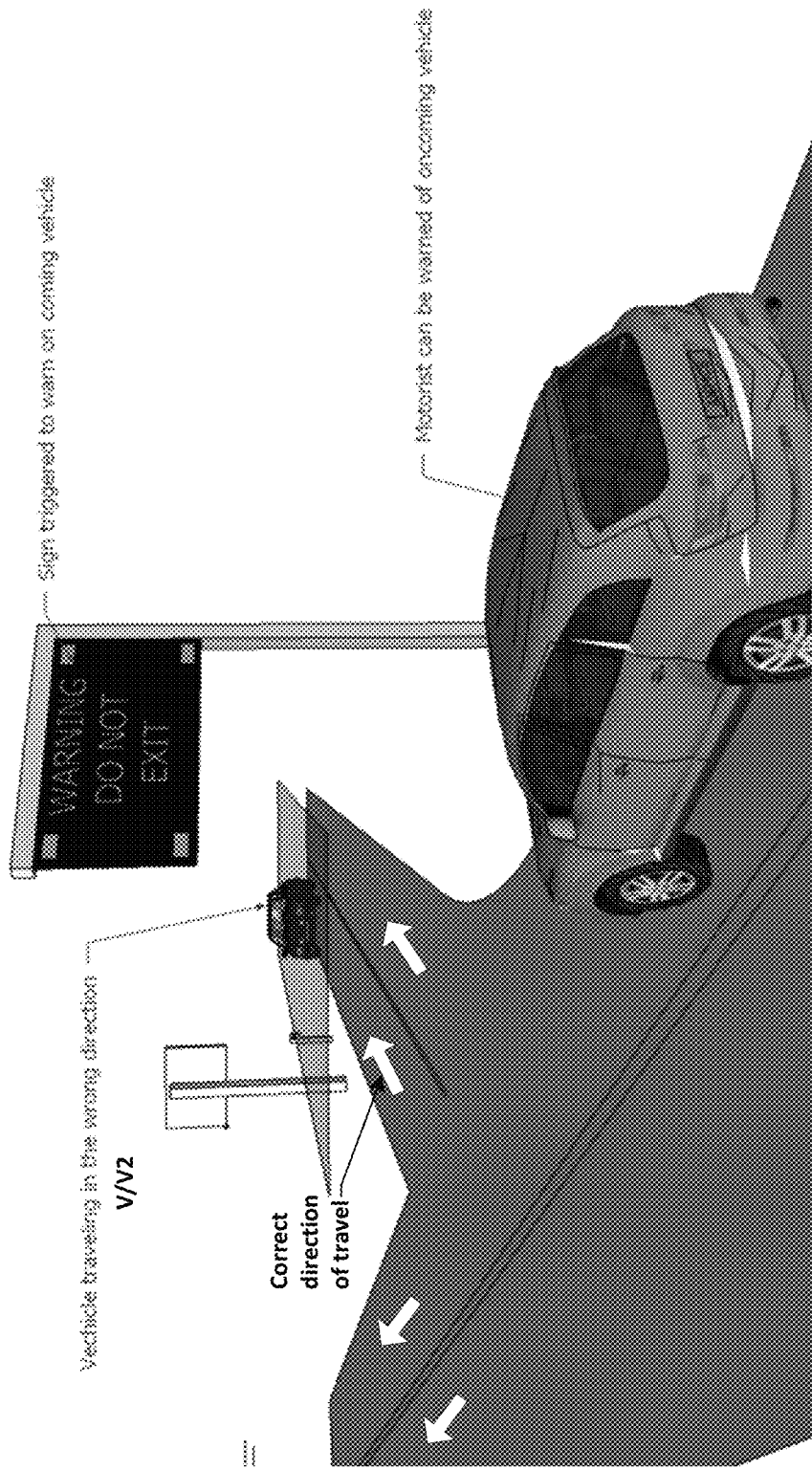
FIG. 5 illustrates an example of a vehicle detection system and method, including detection of a vehicle traveling in a wrong direction.

In one embodiment, as illustrated in the examples of FIGS. 4a and 4b, the light shield or light curtain of the laser field of view 12 includes multiple zones 14, namely, a "right-way" zone, identified as Zone A, and a "wrong-way" zone, identified as Zone B, such that the zones 14 are arranged in an A-to-B configuration with the correct or proper direction of travel, as described above. In the instance of a vehicle V2 traveling the wrong-way (e.g., the wrong direction on a freeway off-ramp), the vehicle V2 enters Zone A and Zone B from the wrong direction. In one example, Zone A and Zone B overlap such that a vehicle V2 traveling the wrong-way enters Zone A and Zone B (substantially) simultaneously at a location of wrong-way entry into the laser field of view 12. In one embodiment, Zone B is configured to include a faster detection time than that of Zone A. Thus, even though the vehicle V2 enters Zone A and Zone B (substantially) simultaneously from the wrong direction, the faster detection logic of Zone B will result in a B-to-A detection and, therefore, trigger a wrong-way event and/or warning, as described below.

In one embodiment, as illustrated in the examples of FIGS. 3, 4a, 4b, and 5, detecting a vehicle V2 that is traveling in the wrong direction triggers or initiates a warning or other event. As an example, a sign, light(s) (e.g., flashing light(s)), annunciator(s), or other may be triggered or initiated to warn, notify, or alert the driver of the wrong-way vehicle and/or warn, notify, or alert others, including other users of the roadway (e.g., a driver of a vehicle traveling in the correct, proper, or intended direction), of a vehicle traveling in the wrong direction. As another example, a recording device may be triggered or initiated to record or capture, for example, video and/or still images of the wrong-way vehicle. As another example, a notification may be triggered or initiated to notify authorities (e.g., police, traffic management) of a vehicle traveling in the wrong direction.

Figure 6:
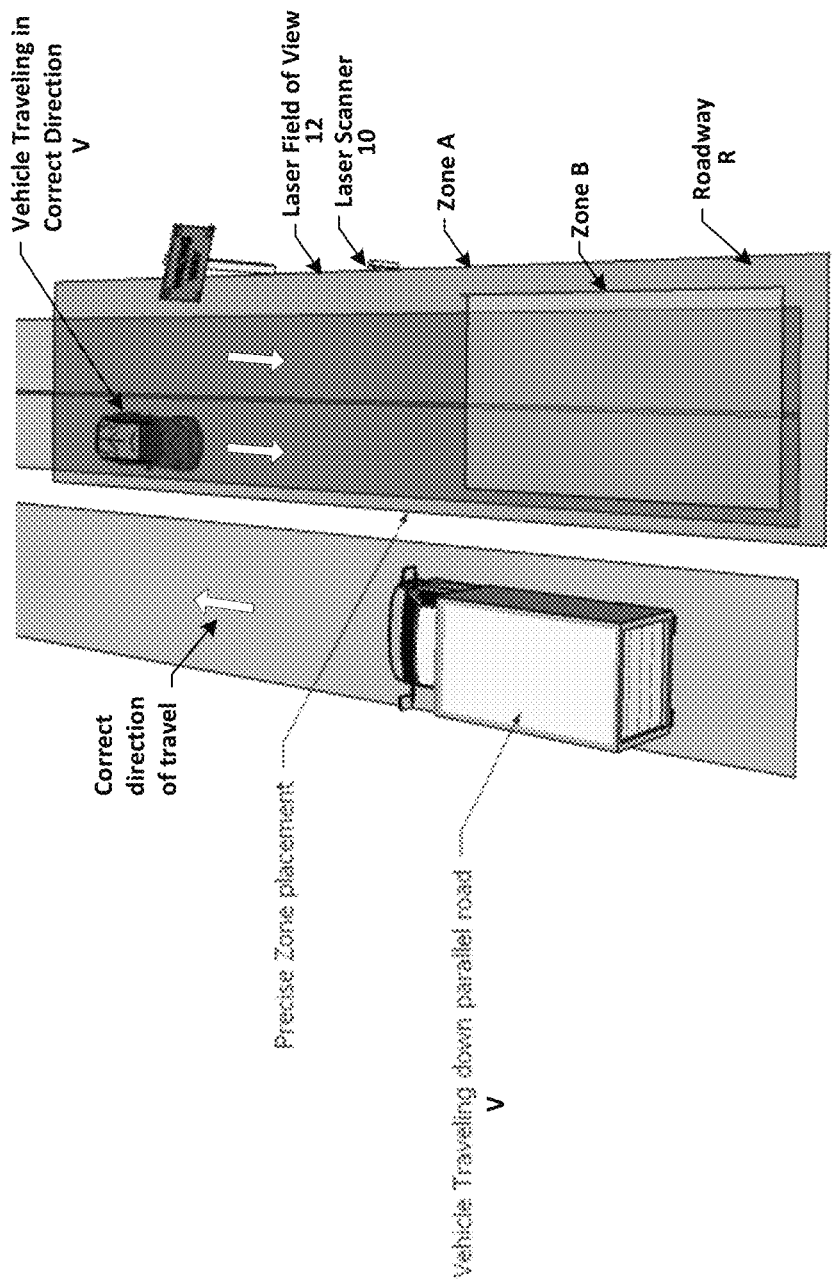
FIG. 6 illustrates an example of a vehicle detection system and method.

As illustrated in the example of FIG. 6, the field of view 12 of the laser sensor/scanner 10 can be configured, defined, or established to extend an exact or defined distance and/or cover a precise area (e.g., cover an exact or approximate width of a lane or lanes to be monitored). As such, the field of view 12 of the laser sensor/scanner 10 can be configured, defined, or established to omit and/or avoid detection of vehicles or other objects in adjacent and/or nearby lanes, on cross streets, or on roads running adjacent and/or parallel to the area being monitored.

In one embodiment, the laser sensor/scanner 10 triggers an event only when an object within the field of view 12 meets a predefined criteria. For example, in one embodiment, the system and method filters out certain objects within or passing through a light shield or light curtain created by the laser sensor(s)/scanner(s) 10. Accordingly, certain objects, such as, for example, pedestrians (e.g., on an adjacent sidewalk), bicyclists, and/or other objects, which may cause false positives, may be filtered out.

Figure 7:
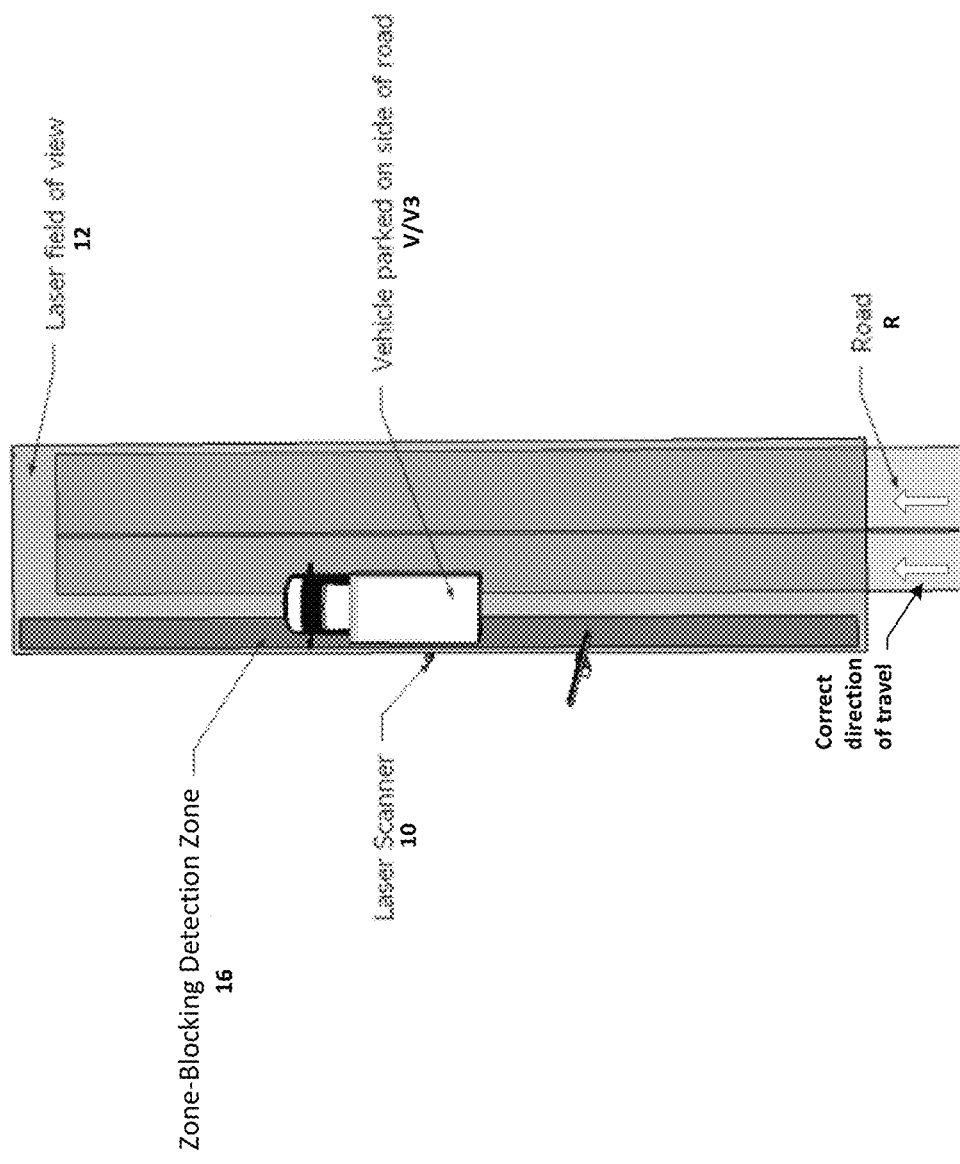
FIG. 7 illustrates an example of a vehicle detection system and method.

In one embodiment, the system and method includes zone blocking detection which provides the ability to detect an object in the laser field of view 12 which could potentially hinder operation of the system. In one example, as illustrated in FIG. 7, a zone-blocking detection zone 16 is established within the laser field of view 12 such that detection of an object, for example, a parked vehicle V3 (e.g., disabled vehicle), within the zone 16 for greater than a defined or predetermined amount of time triggers an alert or other output (e.g., notification of police, traffic management, or other services or authorities).

Figure 8:
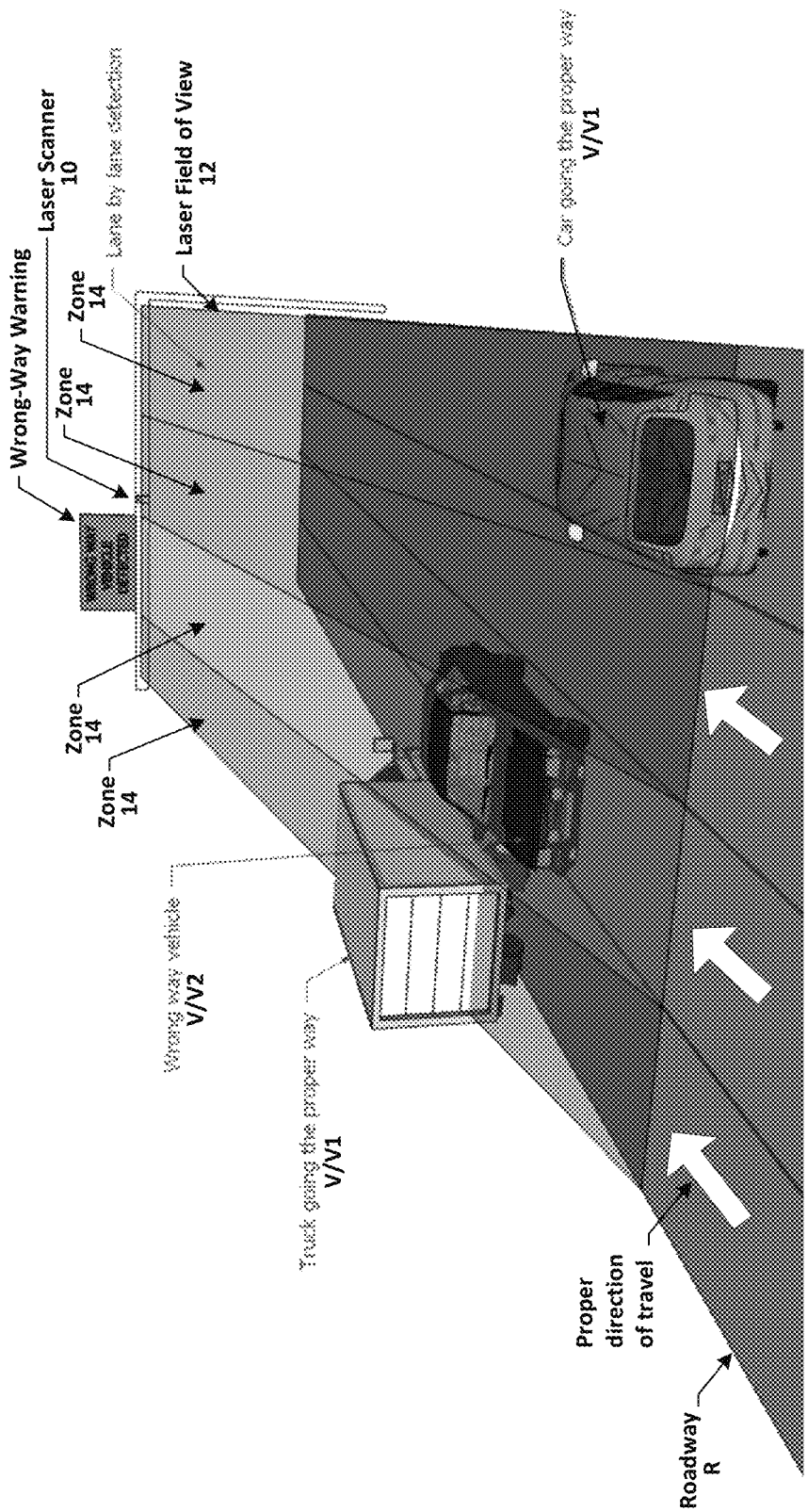
FIG. 8 illustrates an example of a vehicle detection system and method, including detection of a vehicle traveling in a wrong direction.
Figure 9:
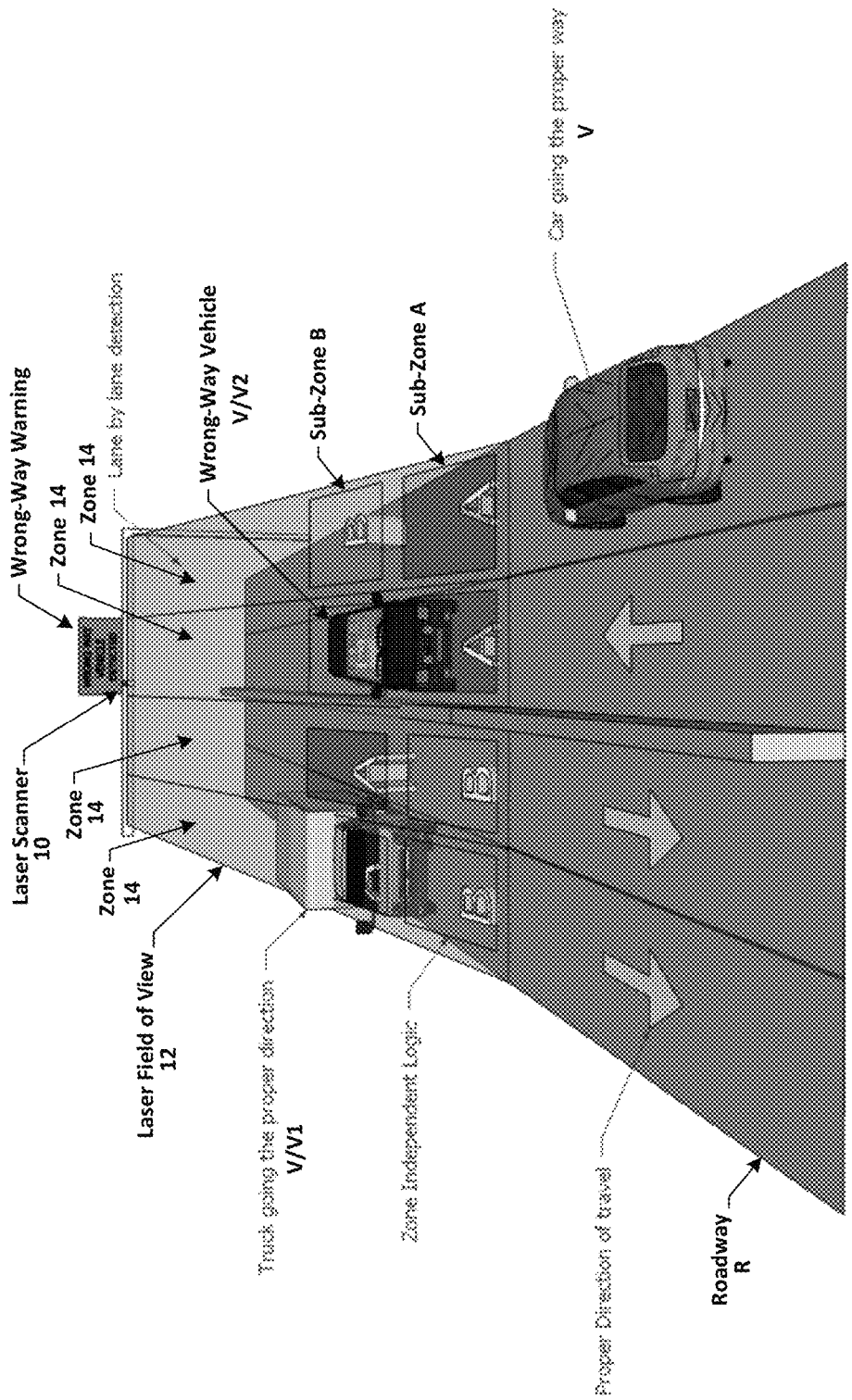
FIG. 9 illustrates an example of a vehicle detection system and method, including detection of a vehicle traveling in a wrong direction.

As illustrated in the examples of FIGS. 8 and 9, the laser sensor/scanner 10 is mounted above the roadway R such that the laser field of view 12 creates or establishes an invisible light shield or light curtain at an angle to the roadway R (i.e., from above to the roadway) in an area or areas where a vehicle V or vehicles V will be traveling.

In one embodiment, the invisible light shield or light curtain of the laser field of view 12 may be configured to define or establish a specific zone 14 or zones 14. In one implementation, the invisible light shield or light curtain may include multiple zones sized or created to cover a specific area or areas. For example, as illustrated in the examples of FIGS. 8 and 9, the invisible light shield or light curtain includes multiple zones 14 created to extend across multiple lanes of a freeway. In one embodiment, each of the zones 14 is configured to cover an exact or approximate width of a lane or lanes to be monitored. In one implementation, individual zones 14 are defined for each lane to independently detect the direction of travel of a vehicle V or vehicles V in each lane. As such, the zones 14 provide lane-by-lane detection and detect a vehicle V or vehicles V only in a corresponding lane, thereby omitting the detection of a vehicle V or vehicles V in an adjacent or nearby lane or lanes. While four zones are illustrated, it is understood that any number of zones (i.e., one or more) and/or any configuration of zones may be established. In one embodiment, multiple zones may be linked together (e.g., with PLC logic) to create a further zone or zones. Although illustrated with four lanes, it is understood that zones may be established for any number of lanes.

In the examples of FIGS. 8 and 9, the vehicle V2 is traveling the wrong-way (e.g., the wrong direction on a freeway). As the vehicle V2 enters (and travels through) the laser field of view 12, the laser sensor/scanner 10 detects the vehicle V2 and the system determines that the vehicle V2 is traveling in the wrong direction.

In one embodiment, as illustrated in the example of FIG. 9, the light shield or light curtain of the laser field of view 12 includes multiple zones (i.e., sub-zones) with zone independent logic. In one implementation, the zones include a first zone, identified as Sub-Zone A, and a second zone, identified as Sub-Zone B, such that the zones are arranged in a A-to-B configuration and result in an A-to-B detection with the correct or proper direction of travel. In the instance of a vehicle V2 traveling the wrong-way (e.g., the wrong direction on a freeway), the vehicle V2 enters Sub-Zone B and then Sub-Zone A thereby resulting in a B-to-A detection and triggering a wrong-way event, such as a warning or other event, as described above. In one example, as illustrated in FIGS. 8 and 9, the warning is associated with the lane of the wrong-way event (e.g., presented above the lane in which the wrong-way vehicle is traveling).

As described and illustrated, the system and method presented provides for detecting a vehicle (or vehicles) that is traveling in the wrong direction (i.e., opposite the correct, proper, or intended direction of travel) on a roadway (street, road, highway, freeway, expressway, turnpike, off-ramp, on-ramp, etc). In this regard, while the examples of FIGS. 1-9 illustrate vehicle detection along straight or generally straight sections of roadway, it is understood, and within the scope of that disclosed, that the system and method presented provides for vehicle detection along non-straight or generally non-straight sections of roadway.

In addition, as described and illustrated, the system and method presented provides that the field of view 12 of the laser sensor/scanner 10 can be configured, defined, or established to extend an exact or defined distance and/or cover a precise area (e.g., cover an exact or approximate width of a lane or lanes to be monitored). In this regard, while the examples of FIGS. 1-9 illustrate the light shield or light curtain of the laser field of view 12 as being rectangular or generally rectangular, including square or generally square, with the zones 14 (sub-zones) being rectangular or generally rectangular, including square or generally square, it is understood, and within the scope of that disclosed, that the light shield or light curtain of the laser field of view 12, including the zones 14 (sub-zones), can be configured, defined, or established to extend an exact or defined distance and/or cover a precise area including non-rectangular or generally non-rectangular areas, including non-square or generally non-square areas.

Figure 10:
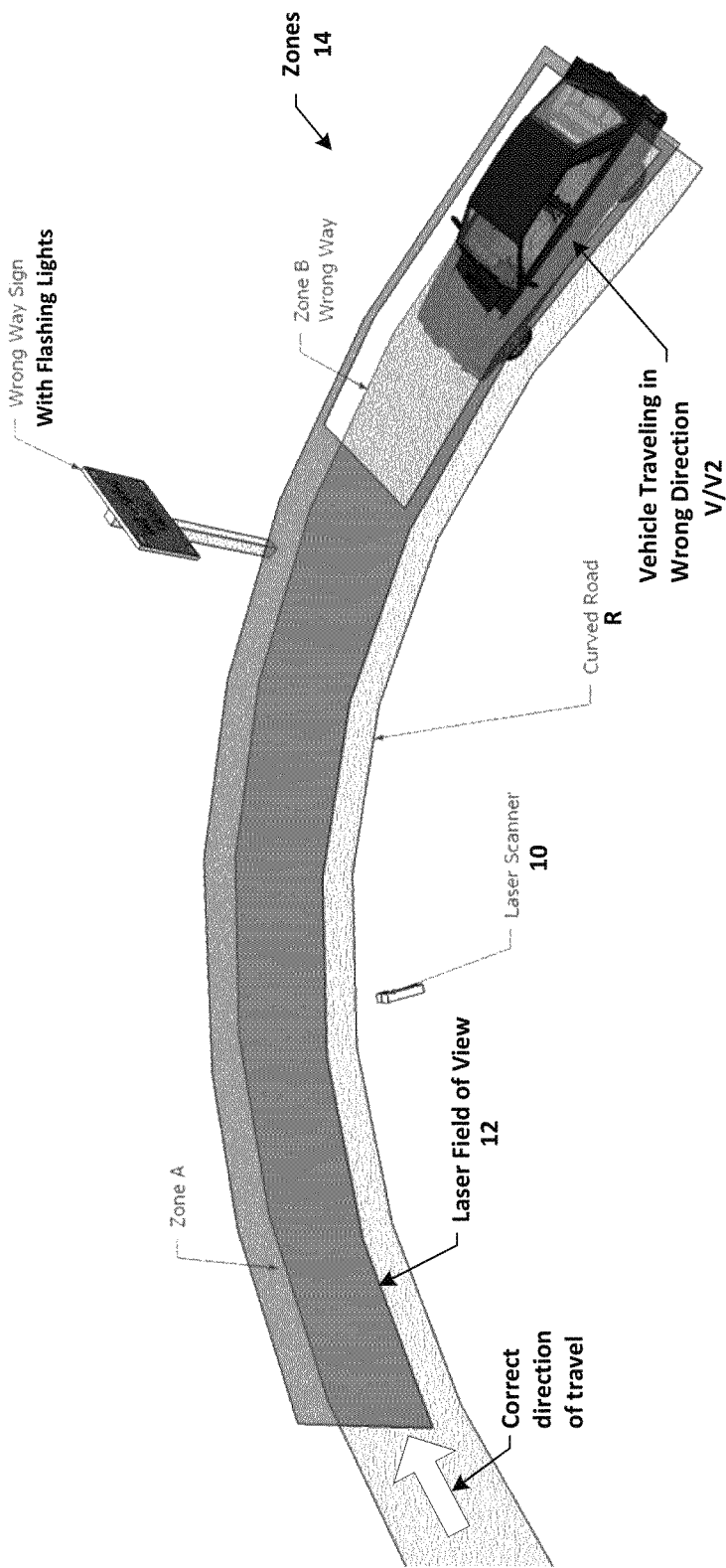
FIG. 10 illustrates an example of a vehicle detection system and method, including detection of a vehicle traveling in a wrong direction.
Figure 11:
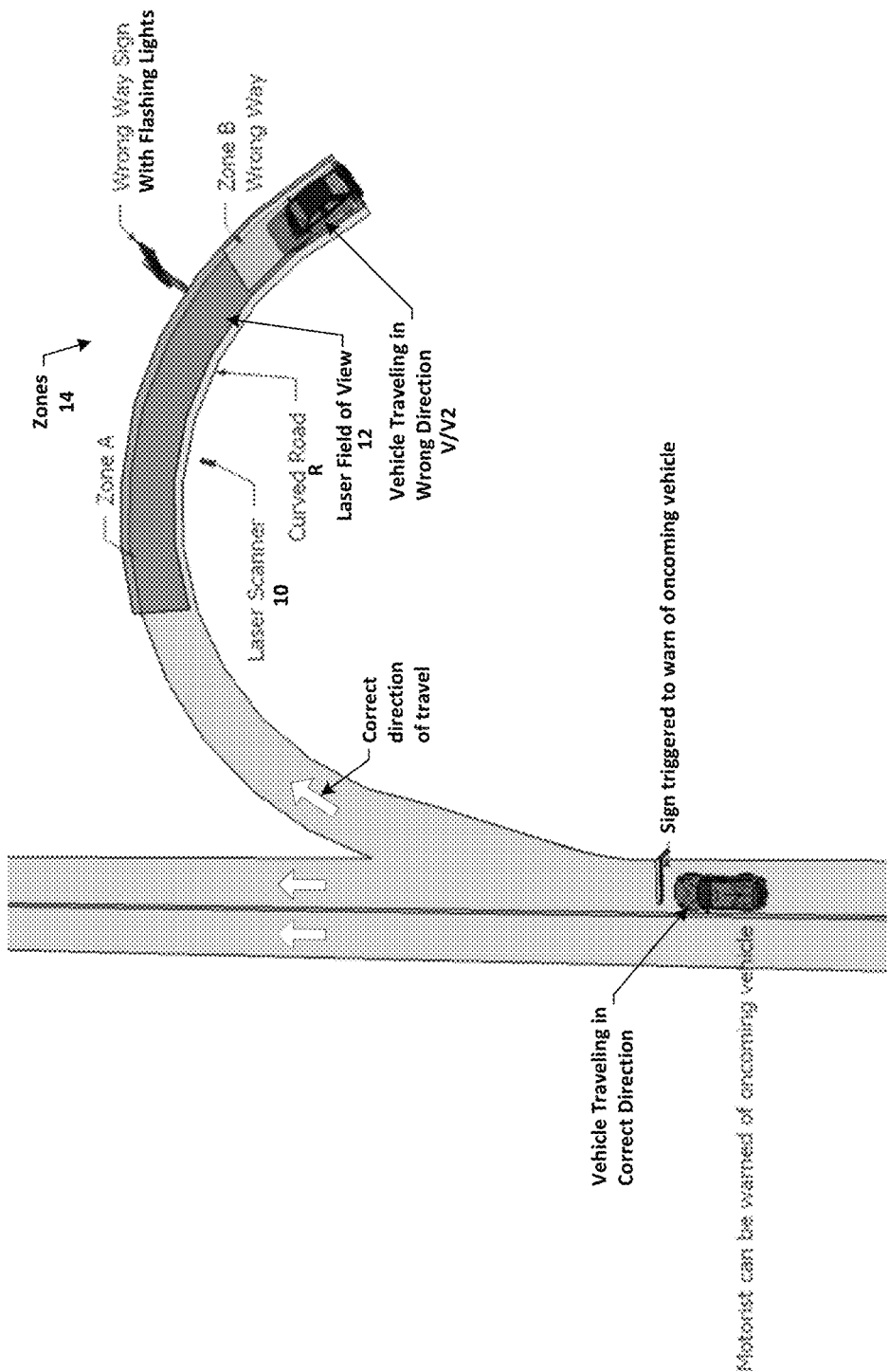
FIG. 11 illustrates an example of a vehicle detection system and method, including detection of a vehicle traveling in a wrong direction.
Figure 12:
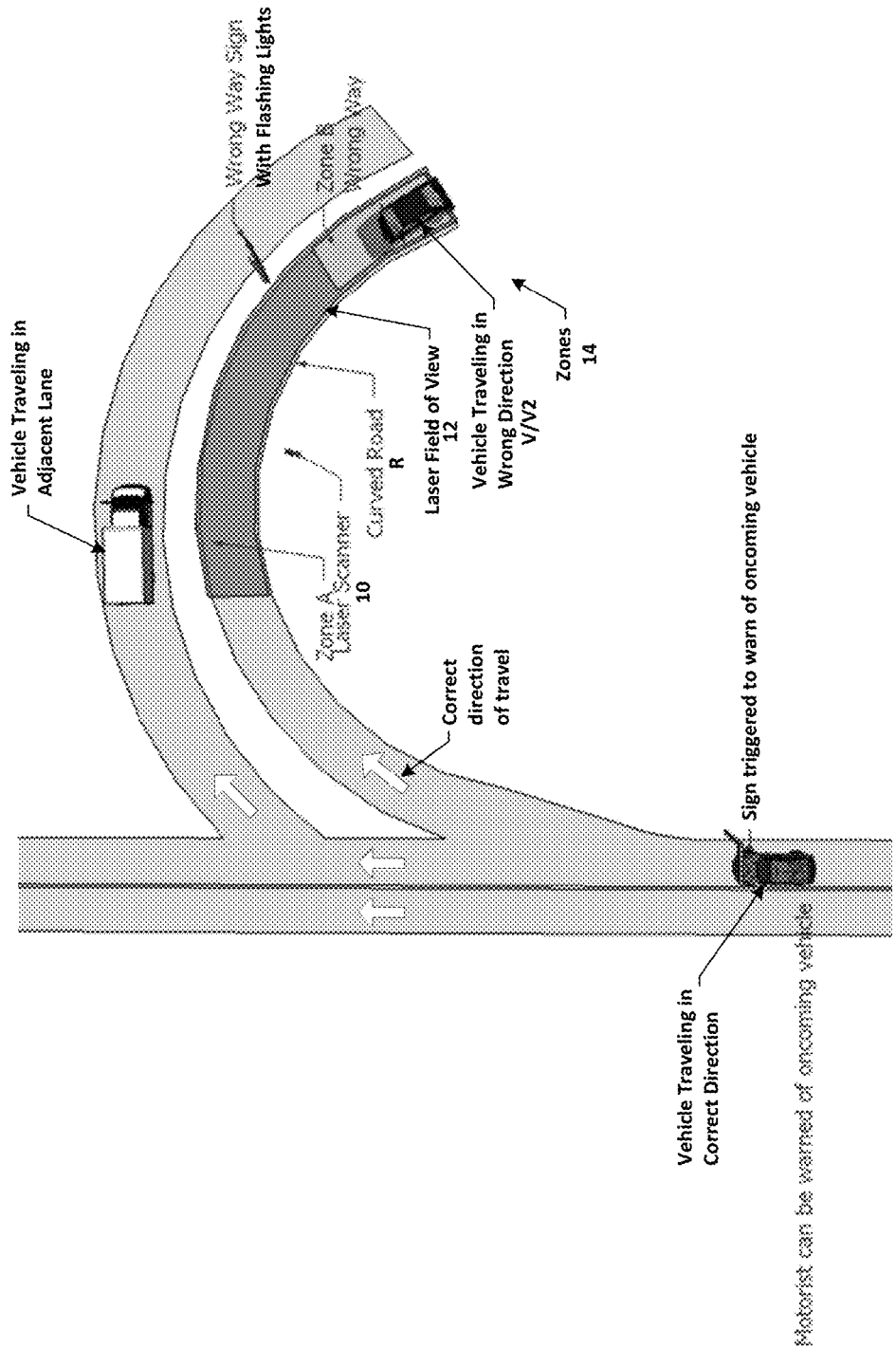
FIG. 12 illustrates an example of a vehicle detection system and method, including detection of a vehicle traveling in a wrong direction.

For example, as illustrated in FIGS. 10, 11, and 12, the roadway R (e.g., off-ramp) is curved and the light shield or light curtain of the laser field of view 12, including the zones 14 or sub-zones (e.g., Zone A and Zone B), is curved. In one implementation, a curvature of the light shield or light curtain of the laser field of view 12 follows or generally follows a curvature of the roadway R. More specifically, in one example, the light shield or light curtain of the laser field of view 12, including the zones 14 or sub-zones (e.g., Zone A and Zone B), includes an inner radius or radii and an outer radius or radii which follow or generally follow an inner radius or radii and an outer radius or radii of the roadway R. As such, the light shield or light curtain of the laser field of view 12 correspondingly follows the roadway R. Thus, the field of view 12 of the laser sensor/scanner 10 is configured, defined, or established to extend an exact or defined distance and/or cover a precise area (e.g., cover an exact or approximate width of a lane or lanes to be monitored). As illustrated in the examples of FIGS. 10, 11, and 12, detection of a vehicle V2 that is traveling in the wrong direction triggers or initiates a warning or other event, as described above.

As described and illustrated, the system and method presented provides that the field of view 12 of the laser sensor/scanner 10 can be configured, defined, or established to omit and/or avoid detection of vehicles or other objects in adjacent and/or nearby lanes, on cross streets, or on roads running adjacent and/or parallel to the area being monitored. For example, as illustrated in FIG. 12, as the field of view 12 of the laser sensor/scanner 10 is configured, defined, or established to extend an exact or defined distance and/or cover a precise area (e.g., cover an exact or approximate width of a lane or lanes to be monitored), the field of view 12 of the laser sensor/scanner 10 can be configured, defined, or established to omit and/or avoid detection of vehicles (or other objects) in adjacent and/or nearby lanes or roads.

As described and illustrated, the system and method presented provides that the light shield or light curtain of the laser field of view includes multiple zones including, in one implementation, a "right-way" zone, identified as Zone A, and a "wrong-way" zone, identified as Zone B, such that the zones are arranged in an A-to-B configuration with the correct or proper direction of travel whereby, in the instance of a vehicle traveling the wrong-way (e.g., the wrong direction on a freeway off-ramp), the vehicle enters Zone A and Zone B from the wrong direction thereby resulting in a B-to-A detection and, therefore, triggering a wrong-way event and/or warning. In addition, the system and method presented provides that detecting a vehicle that is traveling in the wrong direction triggers or initiates a warning or other event including, for example, a sign, light(s) (e.g., flashing light(s)), annunciator(s), or other to warn, notify, or alert the driver of the wrong-way vehicle, or a recording device to record or capture, for example, video and/or still images of the wrong-way vehicle.

Figure 13:
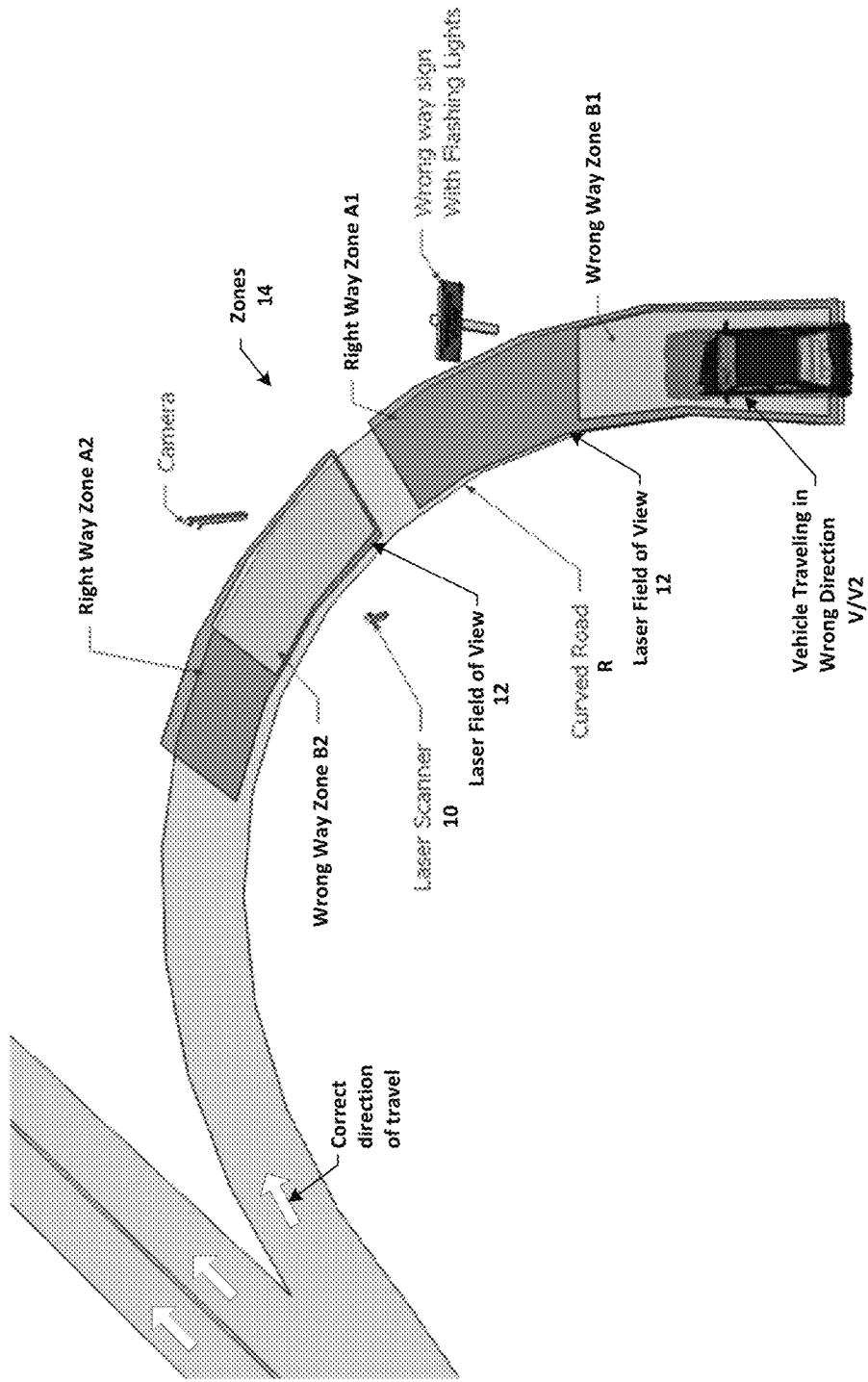
FIG. 13 illustrates an example of a vehicle detection system and method, including detection of a vehicle traveling in a wrong direction.

In one implementation, as illustrated in the example of FIG. 13, the laser field of view 12 includes multiple zones 14 including, for example, "right-way" and "wrong-way" zones, identified as Zones A1 and B1, respectively, which trigger or initiate a warning or other event when detecting a vehicle that is traveling in the wrong direction, and "right-way" and "wrong-way" zones, identified as Zones A2 and B2, respectively, which trigger or initiate a warning or other event when detecting a vehicle that is traveling in the wrong direction. More specifically, with the example of FIG. 13, in the instance of a vehicle V2 traveling the wrong-way (e.g., the wrong direction on a freeway off-ramp), the vehicle V2 enters a first set of "right-way" and "wrong-way" zones, for example, Zones A1 and B1, from the wrong direction thereby resulting in a B1-to-A1 detection and, therefore, triggering a first wrong-way event and/or warning, such as, for example, a sign, light(s) (e.g., flashing light(s)), annunciator(s), or other to warn, notify, or alert the driver of the wrong-way vehicle, and then enters a second set of "right-way" and "wrong-way" zones, for example, Zones A2 and B2, from the wrong direction thereby resulting in a B2-to-A2 detection and, therefore, triggering a second wrong-way event and/or warning, such as, for example, a recording device (e.g., camera) to record or capture, for example, video and/or still images of the wrong-way vehicle.

In one embodiment, as illustrated in the examples of FIGS. 14a and 14b, 15a, 15b, 15c and 15d, 16, and 17, in addition to Zones A and B described above, the light shield or light curtain of the laser field of view 12 further includes one or more reflective zones to determine a direction of travel of a vehicle. In one implementation, the reflective zones include a "right-way" reflective zone, identified as Zone AA, and a "wrong-way" reflective zone, identified as Zone BB, such that the reflective zones are arranged in an AA-to-BB configuration with the correct or proper direction of travel.

In one example, Zones AA and BB are sub-zones within the laser field of view 12. In one implementation, Zones AA and BB are defined between the laser sensor/scanner 10 and respective reflective surfaces "a" and "b" such that reflective surfaces "a" and "b" provide a "fixed" location or "background" surface that the laser sensor/scanner 10 can view or detect. As such, as described below, Zones AA and BB are monitored to determine whether an object (e.g., vehicle or non-vehicle) has blocked or obstructed respective reflective surface "a" or "b" from view or detection by the laser sensor/scanner 10 (i.e., is an object positioned between the laser sensor/scanner and reflective surface "a" or "b" so as to hinder or impede reflection from respective reflective surface "a" or "b").

In one implementation, as illustrated in FIGS. 14a, 14b, 15a, 15b, 15c, 15d, and 17, reflective surfaces "a" and "b" are formed by respective signs or plates, such as, for example, a roadway sign. In another implementation, as illustrated in FIG. 16, reflective surfaces "a" and "b" are formed by different segments or portions of a larger surface, such as, for example, a guardrail, wall or Jersey barrier. In either implementation, reflective surfaces "a" and "b" include any area, length, region, portion, or boundary (of an object or objects) capable of reflecting light or other radiation.

In one example, Zones AA and BB include zone independent logic. For example, Zones AA and BB each include predefined criteria to determine a direction of travel of a vehicle. In one implementation, the predefined criteria include size criteria and time criteria. For example, the size criteria determines whether an object (e.g., vehicle or non-vehicle) has blocked or obstructed at least a predetermined amount (e.g., area, length, region, portion) of reflective surface "a" or "b" from view or detection by the laser sensor/scanner 10. In addition, the time criteria determines whether an object (e.g., vehicle or non-vehicle) has blocked or obstructed reflective surface "a" or "b" from view or detection by the laser sensor/scanner 10 for at least a predetermined amount of time.

Figure 14A:
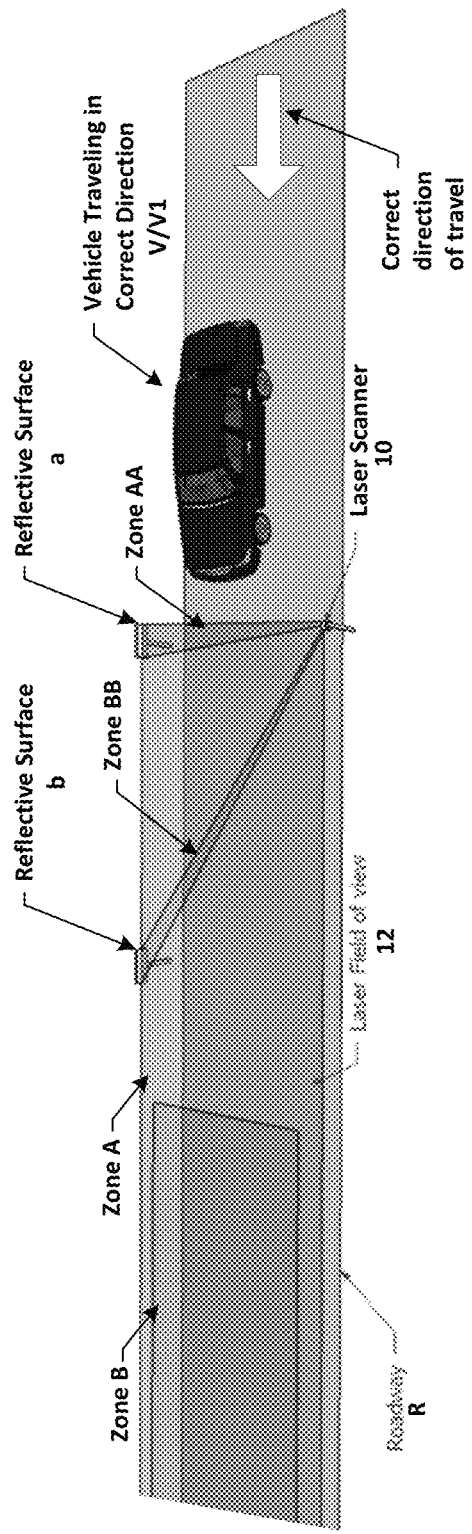
FIGS. 14a and 14b illustrate an example of a vehicle detection system and method, including detection of a vehicle traveling in a correct direction.
Figure 14B:
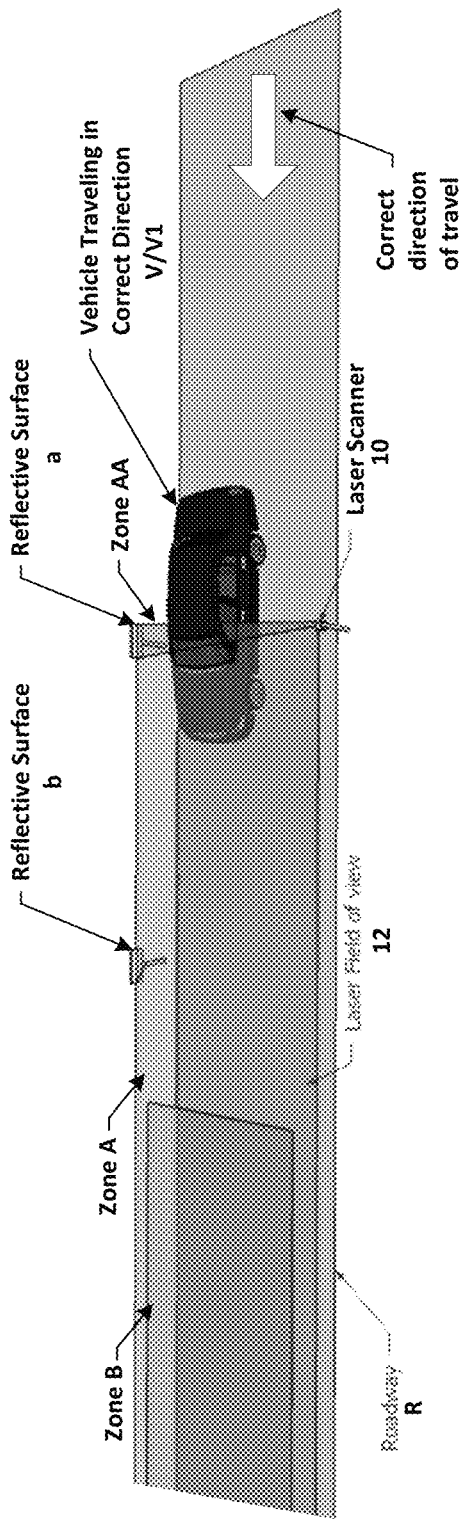

In one example, as illustrated in FIGS. 14a and 14b, the vehicle V1 is traveling in the correct or proper direction. As the vehicle V1 enters (and travels through) Zone AA, reflective surface "a" is blocked or obstructed from view or detection by the laser sensor/scanner 10. In one implementation, with a predetermined amount of reflective surface "a" blocked or obstructed from view or detection by the laser sensor/scanner 10 for a predetermined amount of time, the system determines that the vehicle V1 is traveling in the correct or proper direction. In one example, as illustrated in FIG. 14b, when the system determines that the vehicle V1 is traveling in the correct or proper direction, the system temporally inactivates or disables Zone BB (for example, for the duration that the vehicle is in the laser field of view).

Figure 15A:
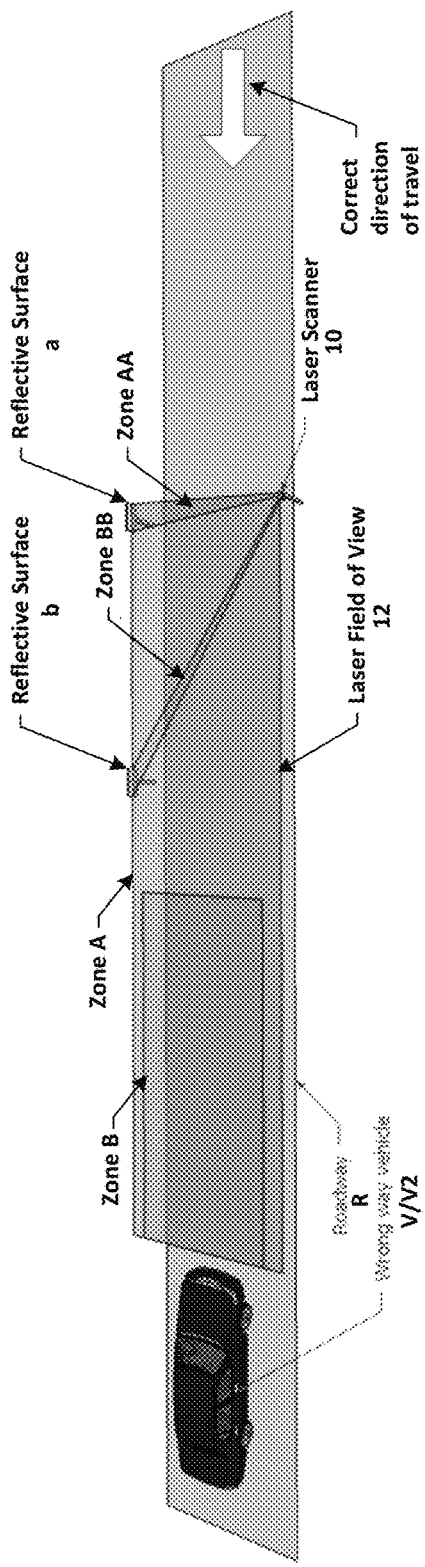
FIGS. 15a, 15b, 15c and 15d illustrate an example of a vehicle detection system and method, including detection of a vehicle traveling in a wrong direction.
Figure 15B:
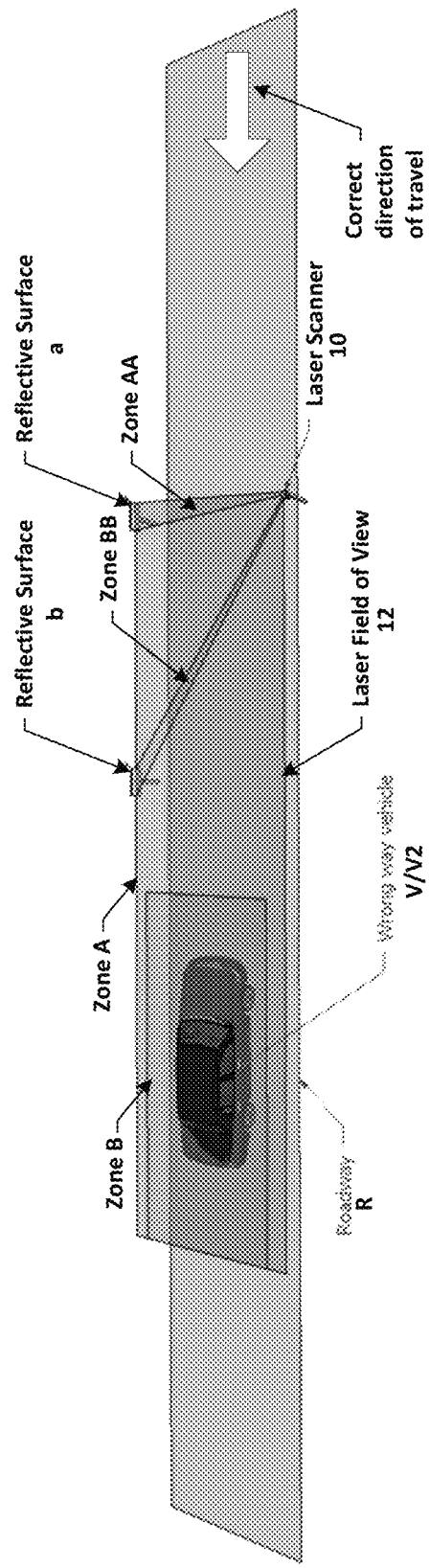
Figure 15C:
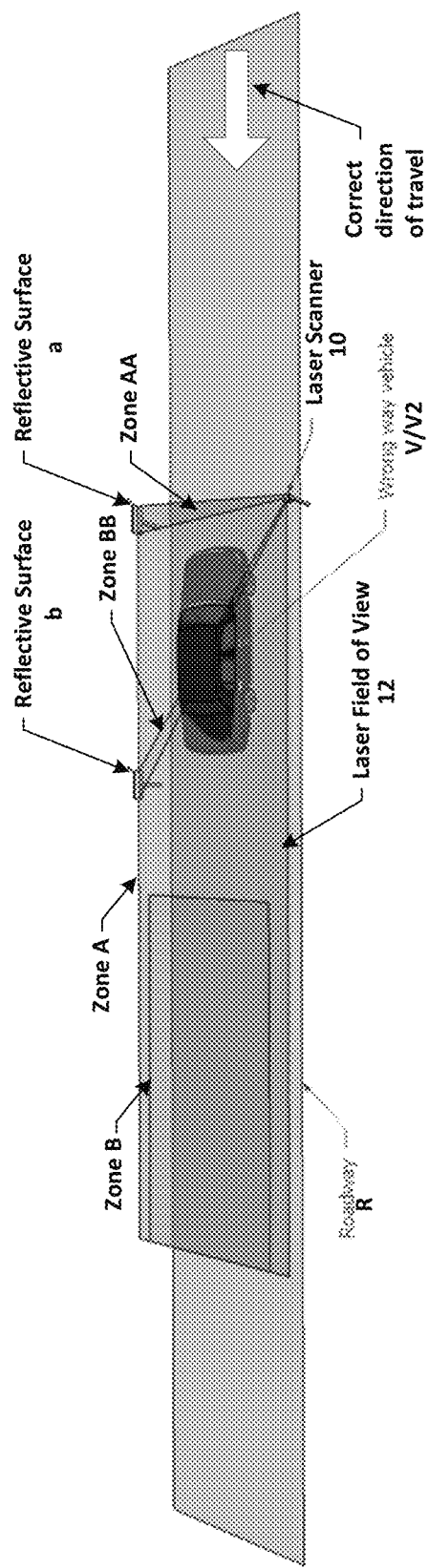

In the example of FIGS. 15a, 15b, 15c and 15d, the vehicle V2 is traveling the wrong-way. As illustrated in the example of FIG. 15b, the vehicle V2 enters Zone A and Zone B from the wrong direction thereby resulting in a B-to-A detection and triggering a wrong-way event and/or warning, as described above. As illustrated in the example of FIG. 15c, as the vehicle V2 continues to travel in the wrong direction and enters (and travels through) Zone BB, reflective surface "b" is blocked or obstructed from view or detection by the laser sensor/scanner 10. In one implementation, with a predetermined amount of reflective surface "b" blocked or obstructed from view or detection by the laser sensor/scanner 10 for a predetermined amount of time, the system determines that the vehicle V2 is traveling (continuing to travel) in the wrong direction.

Figure 15D:
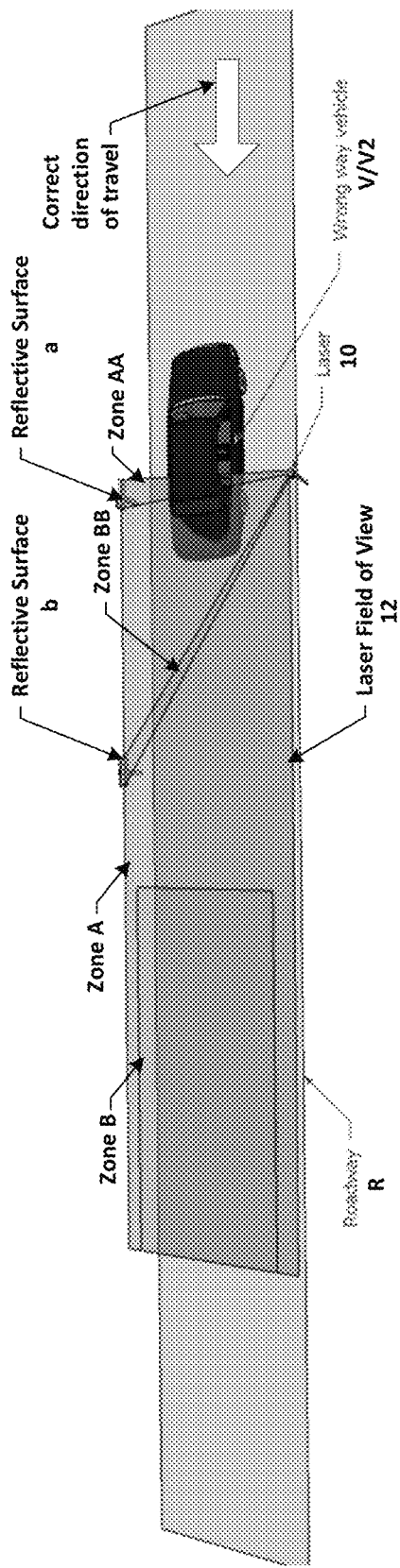
Figure 16:
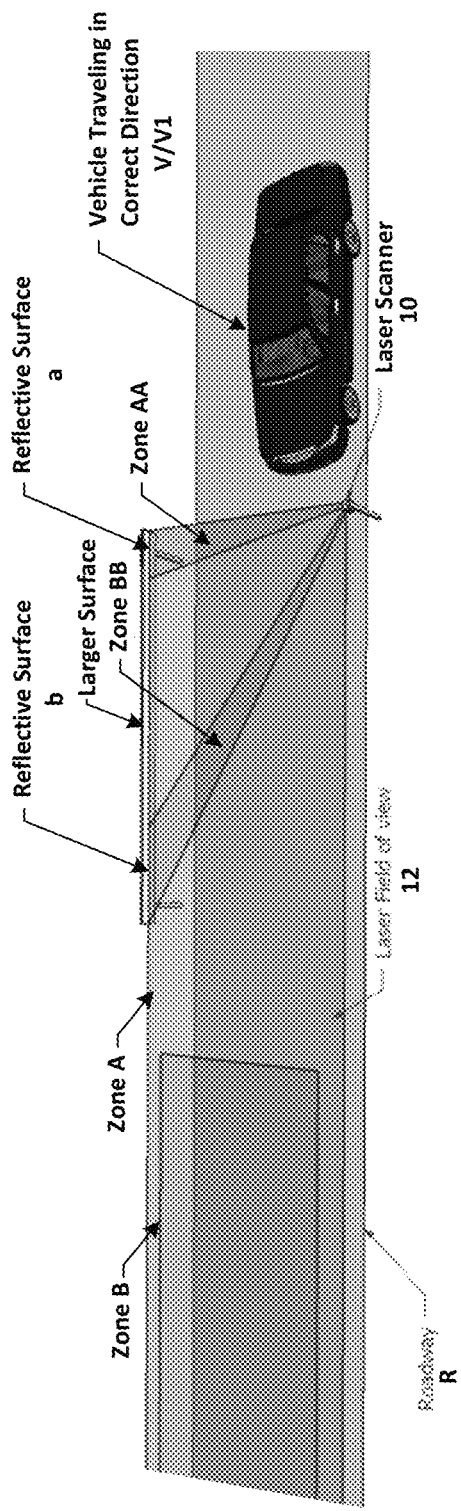
FIG. 16 illustrates an example of a vehicle detection system and method, including detection of a vehicle traveling in a correct direction.
Figure 17:
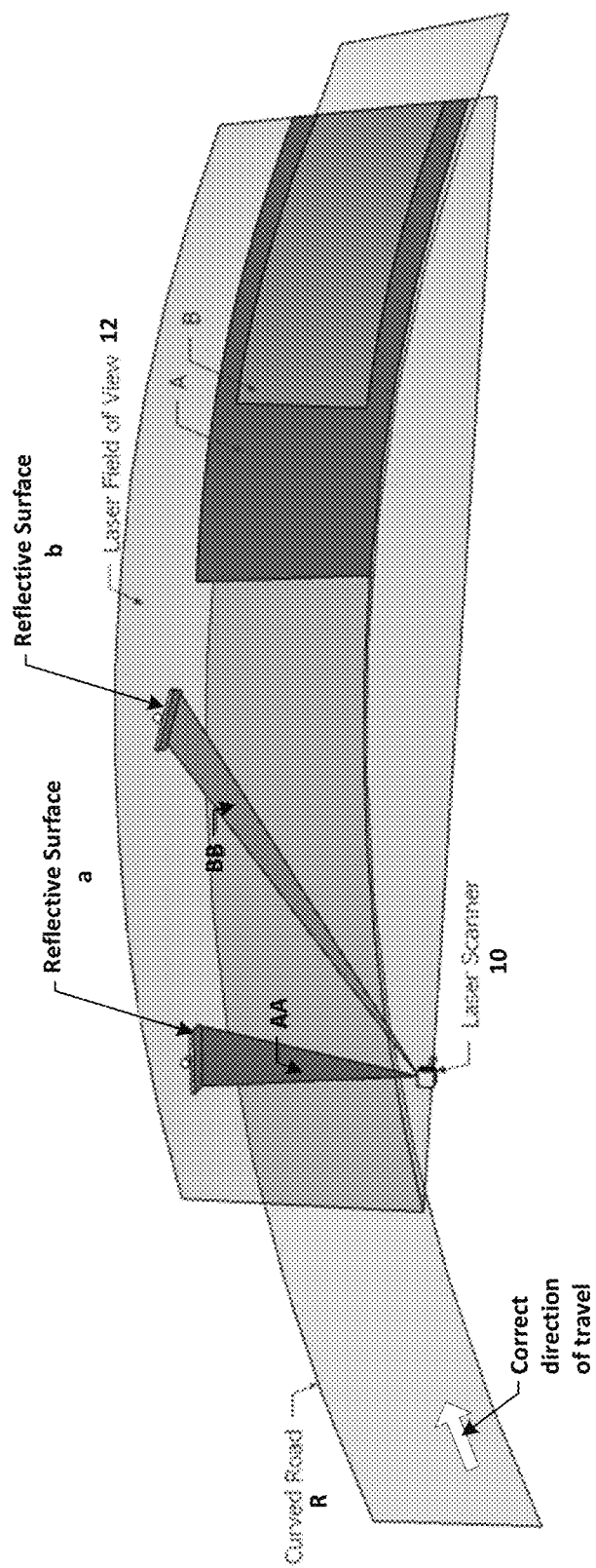
FIG. 17 illustrates an example of a vehicle detection system and method.

In one example, when the system determines that the vehicle V2 is traveling (continuing to travel) in the wrong direction (based on the detection in Zone BB), the system temporally activates or enables Zone AA as a trigger or alarm zone. As such, and as illustrated in the example of FIG. 15d, as the vehicle V2 continues to travel in the wrong direction and enters (and travels through) Zone AA, reflective surface "a" is blocked or obstructed from view or detection by the laser sensor/scanner 10. Thus, in one implementation, with a predetermined amount of reflective surface "a" blocked or obstructed from view or detection by the laser sensor/scanner 10 for a predetermined amount of time, the system triggers or initiates a warning or other event, as described above.

Figure 18:
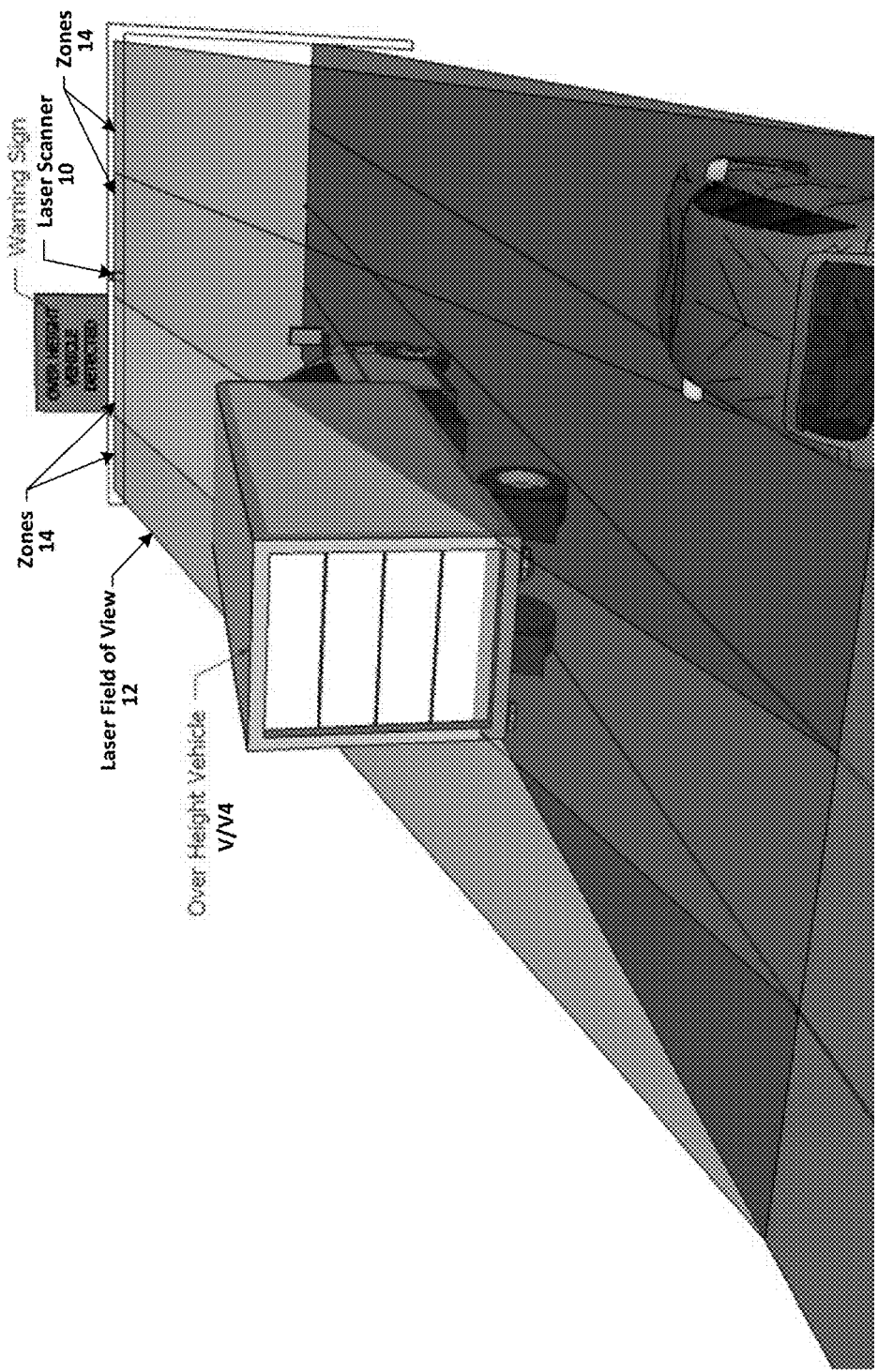
FIG. 18 illustrates an example of a vehicle detection system and method, including detection of an over-height vehicle.
Figure 19:
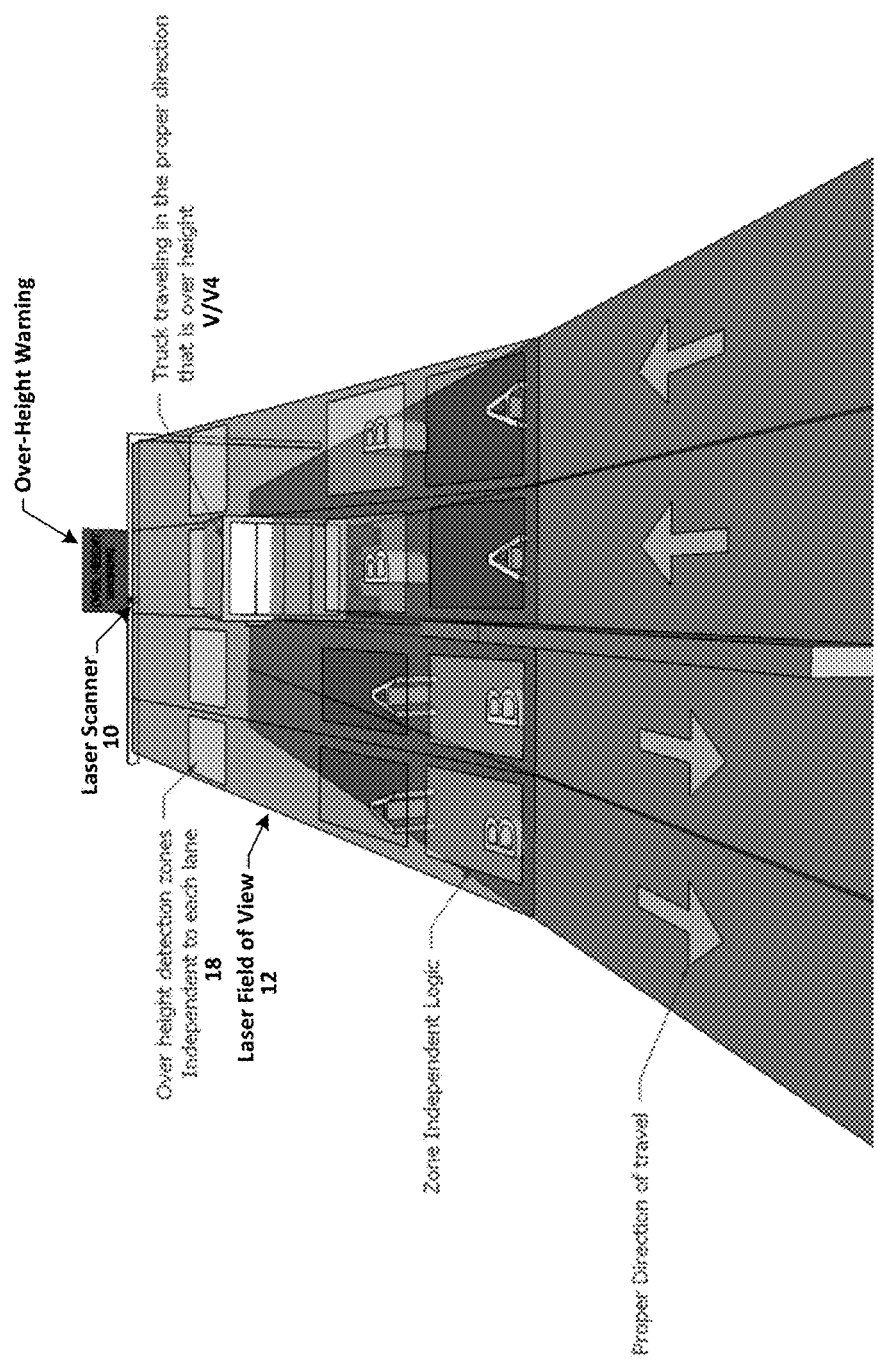
FIG. 19 illustrates an example of a vehicle detection system and method, including detection of an over-height vehicle.

In one embodiment, the laser sensor/scanner 10 functions as a measurement device such that the invisible light shield or light curtain of the laser field of view 12 creates a measurement "curtain" within, for example, a specific zone 14 or zones 14. As such, the laser sensor/scanner 10 measures a height of a vehicle V within the laser field of view 12 and determines whether the vehicle V is near, at, or exceeds a height limit or clearance for the roadway, as illustrated in the examples of FIGS. 18 and 19. Thus, the laser sensor/scanner 10 supports an over-height detection system separate from or in addition to a wrong-way detection system. In one implementation, as illustrated in FIG. 19, the light shield or light curtain of the laser field of view 12 includes an over-height detection zone or zones 18 which detects the height of a vehicle V and determines whether the vehicle V is near, at, or exceeds a height limit or clearance for the roadway. In one embodiment, as illustrated in FIGS. 18 and 19, detecting a vehicle V4 that is near, at, or exceeds a height limit or clearance triggers or initiates a warning or other event (e.g., sign, light(s), annunciator(s), alert, recording, notification).

Figure 20:
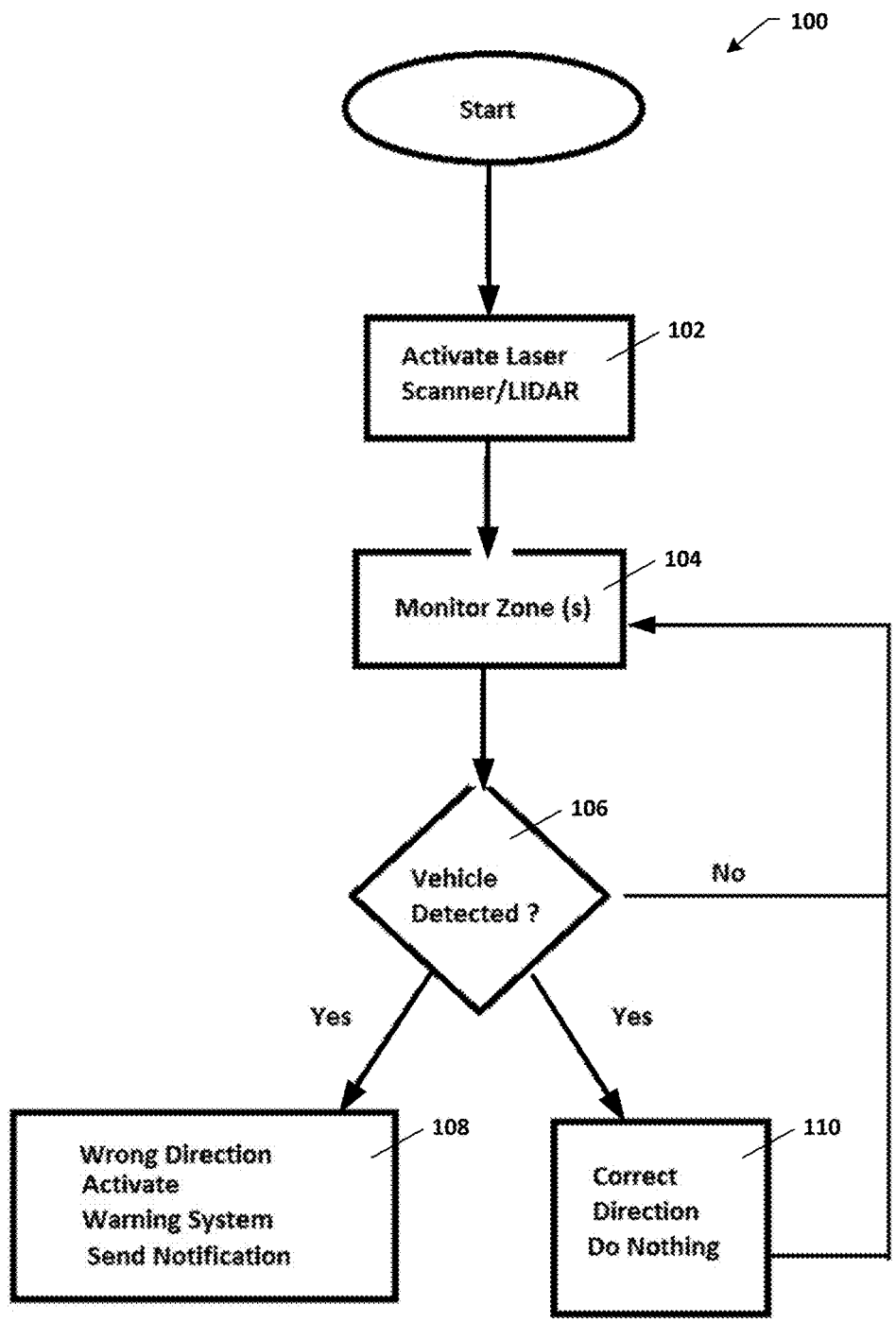
FIG. 20 is a flow chart schematically illustrating an example of a vehicle detection method.

FIG. 20 schematically illustrates one example of a vehicle detection method 100. With the laser sensor(s)/scanner(s) activated, at 102, the zone or zones are monitored, at 104. At 106, detection of a vehicle is determined. In one example, a vehicle V is detected when the vehicle V enters the field of view 12 of the laser sensor(s)/scanner(s) 10, as illustrated, for example, in FIGS. 1-19. In one implementation, logic of the laser sensor/scanner 10, for example, zones or sub-zones within the field of view 12 of the laser sensor/scanner 10, determine the direction of travel of a vehicle V, as described above. In one example, at 108, detection of a vehicle that is traveling in the wrong direction triggers or initiates a warning or other event, as described above. In one example, at 110, with detection of a vehicle that is traveling in the correct direction, monitoring of the zone or zones continues.

Figure 21:
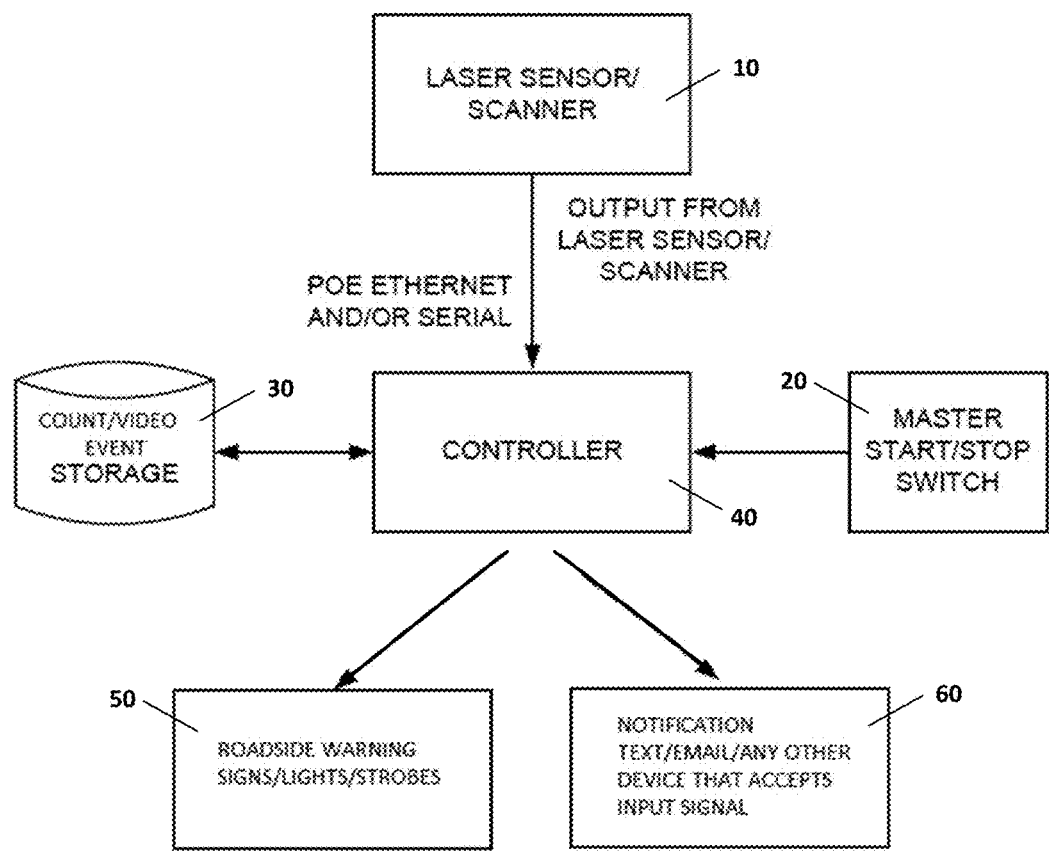
FIG. 21 schematically illustrates an example of a vehicle detection system.

FIG. 21 schematically illustrates one embodiment of a vehicle detection system. In one example, components of the system include one or more laser sensors/scanners 10 (as described above), a master start/stop switch 20, an event storage database 30 (for storing, for example, counts, video/images, etc. of wrong-way events), a control unit or controller 40 with which the other components of the system are operatively and/or communicatively coupled, and associated hardware, firmware, and/or software.

The laser sensor(s)/scanner(s) 10 may be hardwired or wirelessly communicated with the controller 40. For example, the laser sensor(s)/scanner(s) 10 may be PoE (Power over Ethernet) or serially connected laser sensor(s)/scanner(s) 10, such that output of the laser sensor(s)/scanner(s) 10 is provided to the controller 40. In one example, the controller 40 is operatively and/or communicatively coupled with the laser sensor(s)/scanner(s) 10 to provide for input to or configuration of the laser sensor(s)/scanner(s) 10 with, for example, a computing device (e.g., HMI, PC, tablet, portable device). In one example, output of the controller 40, or software which is installed/embedded on a computing device (e.g., HMI, PC, tablet, server, or other device capable of running the software), communicates a detected event (e.g., right-way event, wrong-way event, over-height event) wired or wirelessly to trigger or initiate a warning or other event (e.g., roadside warning 50 such as sign(s), light(s), strobe(s), and/or notification 60 such as text, email, or other to a device that accepts an input signal).

As described above, detection by the laser sensor/scanner 10 of an event (e.g., right-way event, wrong-way event, over-height event) is communicated to the controller. In one example, the controller discriminates or filters the detection to confirm the detection of the event. Data of the event may be recorded, for example, in a storage database, compiled, or manipulated, and emailed, texted or otherwise displayed or distributed to or via a Human Machine Interface (HMI) or PC (positioned, for example, at a counting station), a portable or handheld device (e.g., phone, tablet), or other computing or electronic device. Detection of the event triggers or initiates a warning or other notification.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A vehicle detection system, comprising:
a single sensor mounted to establish a light curtain along a portion of a roadway, the light curtain of the single sensor to define a first zone and a second zone within the first zone; and
a control unit operatively coupled with the single sensor to detect a vehicle on the roadway,
wherein detection of the vehicle in the first zone followed by detection of the vehicle in the second zone indicates a correct direction of travel of the vehicle, and
wherein detection of the vehicle in the second zone prior to detection of the vehicle in the first zone indicates a wrong direction of travel of the vehicle.

2. The system of claim 1, wherein detection of the vehicle in the first zone followed by simultaneous detection of the vehicle in the first zone and the second zone indicates a correct direction of travel of the vehicle.

3. The system of claim 1, wherein substantially simultaneous detection of the vehicle in both the second zone and the first zone indicates a wrong direction of travel of the vehicle.

4. The system of claim 1, wherein the control unit is to initiate an event in response to detection of the wrong direction of travel of the vehicle.

5. The system of claim 4, wherein the event is directed to a driver of the vehicle.

6. The system of claim 4, wherein the event is directed to a driver of another vehicle on the roadway.

7. The system of claim 1, wherein the light curtain is configured to cover a defined area.

8. The system of claim 7, wherein the defined area includes a select lane of the roadway.

9. The system of claim 8, wherein the defined area excludes a lane of the roadway adjacent the select lane of the roadway.

10. A vehicle detection system, comprising:
a sensor mounted to establish a light curtain along a portion of a roadway, the light curtain to define a first zone and a second zone within the first zone; and
a control unit operatively coupled with the sensor to detect a vehicle on the roadway,
wherein detection of the vehicle in the first zone followed by detection of the vehicle in the second zone indicates a correct direction of travel of the vehicle, and
wherein detection of the vehicle in the second zone prior to detection of the vehicle in the first zone indicates a wrong direction of travel of the vehicle, further comprising:
the light curtain defining a first reflective zone between the sensor and a first reflective surface and defining a second reflective zone between the sensor and a second reflective surface,
wherein obstruction of at least one of the first reflective surface and the second reflective surface from detection by the sensor indicates a direction of travel of the vehicle.

11. The system of claim 10, wherein obstruction of at least a predetermined amount of the first reflective surface for at least a predetermined amount of time indicates a correct direction of travel of the vehicle.

12. The system of claim 10, wherein obstruction of at least a predetermined amount of the second reflective surface for at least a predetermined amount of time followed by obstruction of at least a predetermined amount of the first reflective surface for at least a predetermined amount of time indicates a wrong direction of travel of the vehicle and initiates an event.

13. The system of claim 1, wherein the control unit is to initiate an event in response to detection of an object by the single sensor for greater than a predetermined amount of time.

14. The system of claim 1, wherein the light curtain is to detect a height of the vehicle, and the control unit is to initiate an event in response to determination that the vehicle is at a height limit.

15. The system of claim 1, wherein the single sensor comprises a laser scanner.

16. A vehicle detection method, comprising:
establishing a light curtain with a sensor along a portion of a roadway, including defining with the light curtain a first zone and a second zone having a perimeter within the first zone; and
detecting a vehicle on the roadway with the light curtain, including detecting a correct direction of travel of the vehicle in response to detecting the vehicle in the first zone followed by detecting the vehicle in the second zone, and detecting a wrong direction of travel of the vehicle in response to detecting the vehicle in the second zone prior to detecting the vehicle in the first zone.

17. The method of claim 16, further comprising:
initiating an event in response to the detecting the wrong direction of travel of the vehicle.

18. The method of claim 16, further comprising:
defining a first reflective zone between the sensor and a first reflective surface and defining a second reflective zone between the sensor and a second reflective surface; and
detecting a direction of travel of the vehicle in response to obstruction of at least one of the first reflective surface and the second reflective surface from detection by the sensor.

19. The method of claim 18, wherein detecting the direction of travel includes detecting a correct direction of travel in response to obstruction of at least a predetermined amount of the first reflective surface for at least a predetermined amount of time.

20. The method of claim 18, wherein detecting the direction of travel includes detecting a wrong direction of travel and initiating an event in response to obstruction of at least a predetermined amount of the second reflective surface for at least a predetermined amount of time followed by obstruction of at least a predetermined amount of the first reflective surface for at least a predetermined amount of time.

* * * * *